(12) United States Patent
Evnine et al.

(10) Patent No.: US 10,880,242 B2
(45) Date of Patent: *Dec. 29, 2020

(54) PREDICTING AND FACILITATING INCREASED USE OF A MESSAGING APPLICATION

(71) Applicant: Facebook, Inc., Menlo Park, CA (US)

(72) Inventors: Ariel Benjamin Evnine, Oakland, CA (US); Lada Ariana Adamic, Mountain View, CA (US); Peter Henry Martinazzi, Huntington Beach, CA (US); Ojus Abhimanyu Patil, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,111

(22) Filed: Jun. 3, 2019

(65) Prior Publication Data

US 2019/0349323 A1    Nov. 14, 2019

Related U.S. Application Data

(63) Continuation of application No. 14/964,232, filed on Dec. 9, 2015, now Pat. No. 10,313,280.

(60) Provisional application No. 62/236,751, filed on Oct. 2, 2015.

(51) Int. Cl.
| | |
|---|---|
| *G06F 15/16* | (2006.01) |
| *H04L 12/58* | (2006.01) |
| *G06Q 10/06* | (2012.01) |
| *H04W 4/21* | (2018.01) |

(Continued)

(52) U.S. Cl.
CPC ....... *H04L 51/046* (2013.01); *G06Q 10/0639* (2013.01); *H04L 51/16* (2013.01); *H04L 51/24* (2013.01); *H04L 51/32* (2013.01); *H04L 67/22* (2013.01); *H04W 4/21* (2018.02); *G06Q 50/01* (2013.01)

(58) Field of Classification Search
CPC ....... H04L 51/046; H04L 51/16; H04L 51/24; H04L 51/32; H04L 67/22; H04W 4/21; G06Q 10/0639
See application file for complete search history.

(56) References Cited

U.S. PATENT DOCUMENTS

| | | |
|---|---|---|
| 8,898,777 B1 | 11/2014 | Oliver |
| 9,026,592 B1 | 5/2015 | Marra |
| 9,628,576 B1 | 4/2017 | Agarwal et al. |

(Continued)

OTHER PUBLICATIONS

U.S. Appl. No. 14/964,214, Nov. 1, 2017, Office Action.

(Continued)

*Primary Examiner* — Philip B Tran
(74) *Attorney, Agent, or Firm* — Keller Jolley Preece

(57) ABSTRACT

The present disclosure relates to systems and methods for increasing messaging activity in a messaging system. Using the interactions of users with each other and/or with the messaging system, the disclosed systems and methods can predict how likely a pairing of two or more users are to engage in a highly active messaging thread. Based on this prediction, the disclosed methods and systems can, for example, more effectively organize contact lists and conduct promotional efforts associated with messaging features.

20 Claims, 11 Drawing Sheets

(51) Int. Cl.
  *H04L 29/08*       (2006.01)
  *G06Q 50/00*       (2012.01)

(56) References Cited

U.S. PATENT DOCUMENTS

| | | | |
|---|---|---|---|
| 9,646,208 | B2 | 5/2017 | Wu et al. |
| 9,710,134 | B1 | 7/2017 | Russell |
| 10,313,280 | B2 * | 6/2019 | Evnine .............. G06Q 10/0639 |
| 10,333,873 | B2 | 6/2019 | Perez |
| 2007/0130323 | A1 | 6/2007 | Landsman et al. |
| 2009/0228555 | A1 | 9/2009 | Joviak et al. |
| 2010/0036784 | A1 | 2/2010 | Mishne et al. |
| 2010/0241580 | A1 | 9/2010 | Schleier-Smith |
| 2011/0064074 | A1 | 3/2011 | Kreitzberg et al. |
| 2011/0194682 | A1 | 8/2011 | Hans et al. |
| 2011/0246907 | A1 | 10/2011 | Wang et al. |
| 2012/0096352 | A1 | 4/2012 | Maor et al. |
| 2013/0085844 | A1 | 4/2013 | Neystadt et al. |
| 2013/0086641 | A1 | 4/2013 | Mehr et al. |
| 2014/0280582 | A1 | 9/2014 | Aylesworth et al. |
| 2014/0317215 | A1 | 10/2014 | Isaacs et al. |
| 2015/0128058 | A1 | 5/2015 | Anajwala |
| 2015/0242406 | A1 | 8/2015 | Singh et al. |
| 2015/0356449 | A1 | 12/2015 | Vainstein et al. |
| 2016/0036973 | A1 | 2/2016 | Harasimiuk et al. |
| 2016/0092040 | A1 | 3/2016 | Sherman |
| 2016/0119265 | A1 | 4/2016 | Akavaram et al. |
| 2016/0162579 | A1 | 6/2016 | Gao et al. |
| 2017/0031575 | A1 | 2/2017 | Dotan-Cohen et al. |
| 2017/0099250 | A1 | 4/2017 | Perez et al. |

OTHER PUBLICATIONS

U.S. Appl. No. 14/964,214, May 4, 2018, Office Action.
U.S. Appl. No. 14/964,214, Apr. 26, 2019, Office Action.
U.S. Appl. No. 14/964,226, Nov. 16, 2017, Office Action.
U.S. Appl. No. 14/964,226, Aug. 6, 2018, Office Action.
U.S. Appl. No. 14/964,226, Feb. 6, 2019, Notice of Allowance.
U.S. Appl. No. 14/964,232, Dec. 29, 2017, Office Action.
U.S. Appl. No. 14/964,232, Aug. 9, 2018, Office Action.
U.S. Appl. No. 14/964,232, Jan. 17, 2019, Notice of Allowance.
U.S. Appl. No. 14/964,214, Dec. 10, 2019, Office Action.

* cited by examiner

PREDICTING AND FACILITATING INCREASED USE OF A MESSAGING APPLICATION

CROSS REFERENCE TO RELATED APPLICATIONS

The present application is a continuation of U.S. application Ser. No. 14/964,232, filed Dec. 9, 2015, which claims priority from U.S. Provisional Application No. 62/236,751 filed Oct. 2, 2015. The aforementioned applications are hereby incorporated by reference in their entirety.

BACKGROUND

1. Technical Field

The present application relates generally to systems and methods for electronic messaging. More specifically, one or more embodiments relate to systems and methods of increasing the messaging activity of users within a messaging application.

2. Background and Relevant Art

Electronic messaging systems allow users to communicate with others via software applications on one or more types of devices (e.g., desktop devices and mobile devices). For example, some electronic messaging systems allow users of a social network to communicate with other users of the social network (e.g., via direct messaging). Such electronic messaging systems provide a way for users to communicate with a broad spectrum of other users, including family members, friends, coworkers, acquaintances, and even businesses.

Conventional electronic messaging systems typically allow users to manage contacts within a software application for initiating and continuing previous communications with other users. For example, some conventional electronic messaging systems allow users to manage the contents and organization of their contact lists. To illustrate, some conventional electronic messaging systems allow users to organize contact lists in alphabetical order. While alphabetically organized contact lists allow users to predictably locate a specific contact within the contact lists, alphabetical contact lists do not easily allow users to find the contacts with which the users communicate the most.

Some conventional electronic messaging systems also allow users to organize at least some contacts based on frequency and/or recency of communications. Specifically, contacts that a user communicates with the most or has communicated with most recently may be listed at the top of the contact list, while contacts that the user communicates with the least and/or contacts that the user hasn't communicated with for some time may be listed at the bottom of the contact list. Thus, some conventional electronic messaging systems provide a way for users to more easily find and select contacts with which the users have communicated in the past. Historic frequency and recency of communication, however, may not be the most likely predictor of whether the users are likely to engage in future frequent and meaningful conversations with the contacts within the messaging application.

In addition to drawbacks associated with the management of contacts lists, conventional messaging systems also suffer from drawbacks with respect to notifications provided to users. For example, many conventional electronic messaging systems end up spamming users of a software application with many notifications that are not applicable to the users and that the users may find annoying. Users often end up turning off such notifications or simply ignoring the notifications if the notifications are not helpful to the users. Some users can even be turned away from continued use of the software application if the notifications become too annoying.

Accordingly, there are a number of disadvantages with conventional electronic messaging systems and methods.

SUMMARY

One or more embodiments described herein provide benefits and/or solve one or more of the foregoing or other problems in the art with systems and methods that increase messaging activity. In particular, one or more embodiments provide a messaging system for identifying users who are most likely to be highly active within a messaging application with each other. For example, the systems and methods can generate an activity score representing a likelihood that a first user and a second user will engage in a highly active messaging thread with each other. One or more embodiments can determine whether the activity score for the first and second user meets or exceeds a predetermined threshold. Thus, the systems and methods disclosed herein can use the activity of two related users to determine and/or influence the likelihood of messaging activity involving the two users.

One or more embodiments of the systems and methods can also allow users to more easily find other users that are likely to engage with each other in highly active messaging threads. Specifically, one or more embodiments involve providing a contact list organized to display contacts based on how likely a user is to engage with the contacts in a highly active thread. For example, the systems and methods can organize a contact list for a user based on activity scores for the user and each contact in the contact list. Thus, one or more embodiments can more prominently display contacts with which a user is more likely to actively engage in communication, thereby increasing the likelihood of high messaging activity.

Additionally, the systems and methods can increase the likelihood of high activity in the messaging system by promoting features of the messaging application. For example, one or more embodiments can promote features of the messaging application to one or more users relating to an association between users. In particular, one or more embodiments can selectively promote a feature of the messaging application to a user based on an activity score representing a likelihood that two users will engage in a highly active messaging thread. By selectively promoting features of the messaging application as they relate to users that are likely to engage in a highly active messaging thread, the systems and methods can improve the effectiveness of promotions of the messaging application.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
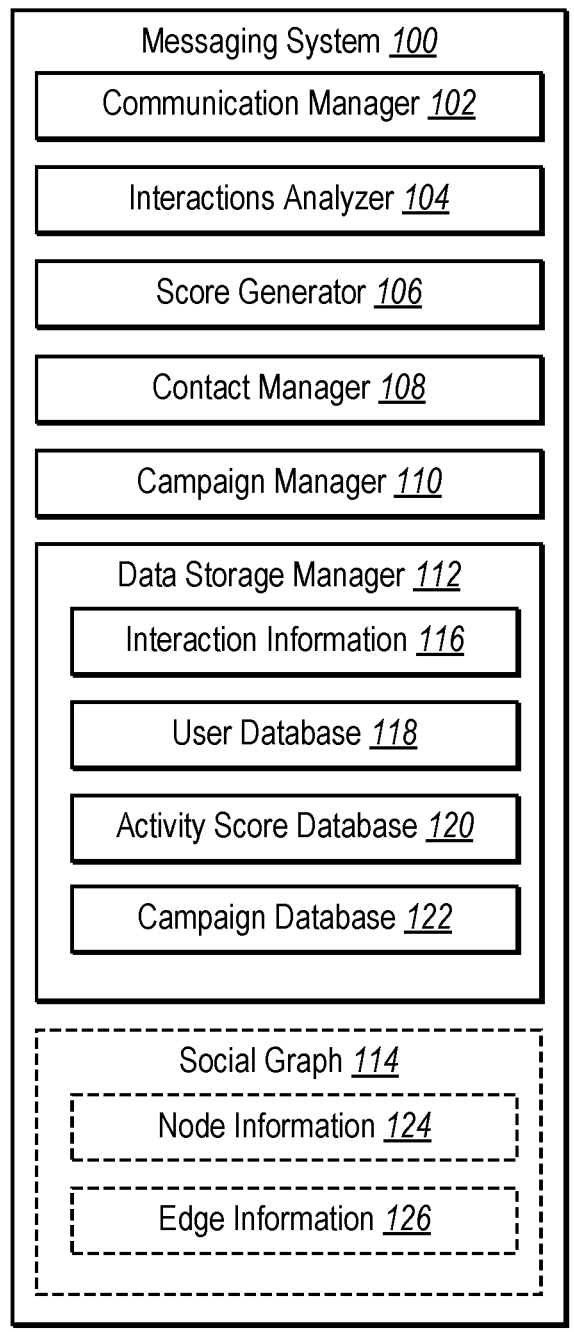
FIG. 1 illustrates a schematic diagram of an electronic messaging system in accordance with one or more embodiments.

Embodiments of the present disclosure provide an electronic message system that increases messaging activity. In particular, one or more embodiments provide an electronic messaging system that allows two or more users to send and receive messages. The electronic messaging system can also predict whether users will engage in highly active communications based on behaviors of the users in connection with the electronic messaging system. For example, the electronic messaging system can identify interactions related to an association between two users to determine whether the two users are likely to engage in a highly active messaging thread with each other in the future. Identifying pairs of users who are most likely to engage in highly active messaging threads with each other can aid the electronic messaging system in increasing overall messaging activity in the system.

According to one or more embodiments, the electronic messaging system allows users to interact with content associated with others within the electronic messaging system. For example, the electronic messaging system can provide a messaging application for users to exchange electronic messages with other users. To illustrate, the electronic messaging system can also allow users to interact with electronic messages within a messaging application or to perform various other interactions associated with content within the electronic messaging system. In some embodiments, the electronic messaging system further facilitates and/or monitors user interactions with other users and/or content by way of a social networking system.

Furthermore, the electronic messaging system can use interactions by users to predict future activity between the users. For example, the electronic messaging system can analyze user interactions related to an association between two users to determine whether the two users are likely to engage in a highly active messaging thread. Specifically, the electronic messaging system can determine, from the user interactions, whether the users are likely to engage in messaging threads that span a certain amount of time and/or include a certain number of exchanged messages.

One or more embodiments of the electronic messaging system can generate an activity score associated with a pair of users. Specifically, the electronic messaging system can generate the activity score using the interactions related to the association between the users. The activity score can represent a likelihood that the users will engage in a highly active message thread with each other. Thus, the electronic messaging system can quantify the likelihood that two users will actively participate in communications with each other, which allows the system to determine which users to target to increase messaging activity within the system. Because a small percentage of users frequently make up a large percentage of messaging activity in messaging systems, encouraging users to engage in more highly active messaging threads can increase the overall amount of messaging activity within the system.

In one or more embodiments, the electronic messaging system can use the activity score for a pair of users to determine whether to perform one or more operations in connection with the users. In particular, the electronic messaging system can compare the activity score to a predetermined threshold. If the activity score meets or exceeds the threshold, the electronic messaging system can perform one or more operations with the purpose of increasing messaging activity between the users.

According to one or more embodiments, the electronic messaging system can organize a contact list based on a likelihood of users to actively engage with each other. Specifically, the electronic messaging system can organize the contact list of a user to more prominently display users that are most likely engage with the user in a highly active messaging thread. For example, the electronic messaging system can display users that are most likely to engage in a highly active messaging thread with a user at the top of a contact list. In doing so, the electronic messaging system can generate activity scores related to associations between the user and each of a user's contacts in a contact list and rank the users based on the corresponding activity scores. Thus, the electronic messaging system can organize the contact list by displaying users associated with high activity scores in prominent positions in the contact list, and users associated with low activity scores in positions that are not as prominent or perhaps not shown in the contact list. Thus, the electronic messaging system can encourage the user to initiate messaging threads with users who are most likely to actively engage in communications with the user by visually organizing the users within a contact list.

Additionally, or alternatively, one or more embodiments of the electronic messaging system can selectively promote features of the system based on the likelihood of high messaging activity. Specifically, the electronic messaging system can selectively promote features of a messaging application based on the activity levels of pairs of users of the messaging application. Promoting certain features of the messaging application based on the likelihood of high messaging activity may allow the electronic messaging system to more effectively and efficiently target users of the messaging application. Additionally, promoting features of the messaging application based on the activity scores may prevent users from receiving notifications that are unwanted and/or not useful to the users.

In one or more embodiments, the electronic messaging system can promote features of a messaging application for a specific event. For example, the system can provide a notification to a first user to use the messaging application to send a message to a second user in connection with a specific event (e.g., a birthday or anniversary) associated with the second user. Selectively promoting features of the messaging application based on specific events can encourage communication between users related to information that is personal to the users, increasing the likelihood of messaging activity between the users.

As used herein, the term "highly active messaging thread" refers to a messaging thread that the electronic messaging system has determined includes a threshold amount of activity. For example, a highly active messaging thread can be a messaging thread having a threshold number of messages exchanged within a particular time period. To illustrate, a highly active messaging thread can include threads that are active for at least four days out of seven and have fifty or more messages within the seven days. The electronic messaging system may use additional or alternative criteria for determining whether a messaging thread is highly active. In one or more embodiments, the electronic messaging system may use thresholds that are individual to a particular user based on their messaging activity.

As used herein, the term "activity score" refers to a representation of a probability of future activity between at least two users of a messaging application. Specifically, an activity score can represent a likelihood that the two users will engage in a highly active messaging thread in the future. An activity score can include a numerical value based on prior interactions of a pairing of two or more users. The interactions can be between the two or more users (e.g., messages between the users) and/or independent of an association between the two or more users (e.g., web browsing histories of the users).

As used herein, the term "interaction" refers to an action by a user to engage with content or other users. An interaction can be within a dedicated messaging application via an electronic messaging system of a social networking system or independent of the dedicated messaging application (e.g., interactions with a separate system or application). An interaction can include an action by a user in association with a message, notification, or other content item. For example, interactions can include, but are not limited to, the creation and sending of messages; clicks on messages, notifications, or content items; "likes" of messages or content items; comments; views; shares; and/or tagging messages or content items.

As used herein, the term "message" refers to any form of electronic communication between two or more computing devices. Messages can include text, photos, stickers or other icons, videos, voice recordings, etc. In one or more embodiments, a message is an instant message communicated in real-time or near real-time. In alternative embodiments, however, a message can refer to any from of electronic communication, such as an SMS message, an email, or a social network post or comment.

FIG. 1 illustrates a schematic diagram illustrating an electronic messaging system (or simply "messaging system" 100). In general, the messaging system 100 can allow users of the messaging system 100 to exchange messages with each other via a messaging application in a social networking system (as described in more detail in relation to FIG. 2). Additionally, or alternatively, the messaging system 100 may allow users to exchange messages with each other within another type of system with messaging capabilities.

As shown, the messaging system 100 includes a communication manager 102, an interactions analyzer 104, a score generator 106, a contact manager 108, a campaign manager 110, and a data storage manager 112. As described below with reference to FIG. 11, the messaging system 100 can also optionally include and/or access a social graph 114 that includes node information 124 and edge information 126. Each of the components of the messaging system 100 can communicate with each other using any suitable communication technologies.

It will be recognized that although the components are shown to be separate in FIG. 1, any of the components may be combined into fewer components, such as into a single facility or module, or divided into more components as may serve a particular embodiment. For example, a single component may perform operations associated with a plurality of components (e.g., the communications manager 102, the interactions analyzer 104, the score generator 106, the contact manager 108, the campaign manager 110, and/or the data storage manager 112). Alternatively, any of the components in FIG. 1 may be divided into more than one additional components to perform the functions of the particular component. In one or more embodiments, the messaging system 100 may include additional components not described or shown in FIG. 1.

The components of the messaging system 100 can include software, hardware, or both. For example, the components can include computer instructions stored on a non-transitory computer-readable storage medium and executable by at least one processor of the messaging system 100. When executed by the at least one processor, the computer-executable instructions can cause the messaging system 100 to perform the methods and processes described herein. Alternatively, the components can include hardware, such as a special purpose processing device to perform a certain function or group of functions. Additionally or alternatively, the components can include a combination of computer-executable instructions and hardware.

As mentioned above, the messaging system 100 can include a communication manager 102. The communication manager 102 can facilitate communication with a plurality of client devices and any other devices in communication with the messaging system 100. For example, the communication manager 102 can communicate with one or more software applications at the client devices including one or more messaging applications or social networking applications running on each of the client devices. To illustrate, the communication manager 102 can receive information from and send information to the messaging applications of the client devices.

Additionally, the communication manager 102 can process messages and interactions received from client devices for use by other components of the messaging system 100. For example, the communication manager 102 can receive or otherwise detect a message or interaction from a client device, identify the user associated with the client device, identify an intended recipient of the message or a subject of the interaction, and send data representative of the message or interaction to the client device associated with the intended recipient. One will appreciate that the communication manager 102 can direct a message for a recipient to multiple client devices associated with the recipient (i.e., each device upon which the user has installed a version of the messaging application).

Additionally, the communication manager 102 can also re-format or otherwise modify the content or format of a message based on the messaging protocol used by a destination communication device or application. As such, in one or more embodiments the messaging system 100 can allow participants using different communication platforms to exchange messages. For example, the communication manager 102 can receive a message in a first protocol (SMS, IM, XMPP, APNS, etc.), re-format the message into a second protocol, and send the reformatted message to the intended recipient(s).

The messaging system 100 can also include an interactions analyzer 104 to facilitate analysis of interactions via the messaging system 100. Specifically, the interactions analyzer 104 can identify interactions by users via the messaging system 100 and analyze the interactions to determine one or more characteristics of the interactions. For example, the interactions analyzer 104 can determine a type of interaction, an object or target of the interaction, and any users affected by or associated with the interaction or the object of the interaction. Thus, the interactions analyzer 104 can determine who performed an interaction, as well whether the interaction relates to a particular association between the user performing the interaction and at least one other user. To illustrate, the interactions analyzer 104 can determine that a user performs an interaction that relates, directly or indirectly, to another user, as will be explained in more detail below.

In one or more embodiments, the messaging system 100 includes a score generator 106 to facilitate scoring activity levels of users of the messaging system 100. In particular, the score generator 106 can generate activity scores for users based on interactions by the users. For example, the score generator 106 can communicate with the interactions analyzer 104 to identify interactions by the users for calculating an activity score. The score generator 106 can use interactions related to an association between the users to generate an activity score that corresponds to the association between the users.

In one or more embodiments, the score generator 106 generates an activity score for a pair of users to represent the likelihood that the pair of users will engage in a highly active messaging thread. For example, the score generator 106 can generate an activity score for each pair of users that includes a first user and a user from a contact list of the first user. Thus, the score generator 106 can determine a likelihood that the first user will interact with each of the users in the first user's contact list.

In one or more embodiments, the messaging system 100 includes a contact manager 108 to facilitate management of users' contacts. For example, the contact manager 108 can organize users in a contact list to allow the user to more easily find and communicate with other users in a messaging application. In particular, the contact manager 108 can organize the users in the contact list based on the activity score corresponding to each of the users in the contact list. To illustrate, the contact manager 108 can organize the contact list based on how likely the user of the client device is to engage in highly active messaging with each user in the contact list, thereby increasing the probability of messaging between certain users. The contact manager 108 can also organize the contact list based on additional or alternative criteria, including manually selected criteria by the user.

At least some embodiments of the messaging system 100 also include a campaign manager 110 to facilitate management of promotional campaigns via the messaging system 100. Specifically, the campaign manager 110 can use activity information, such as activity scores, to determine which users or pairs of users to target with certain promotional campaigns. To illustrate, the campaign manager 110 can selectively promote features of a messaging application in relation to an association of a pair of users based on the activity score of the pair of users. Selectively promoting features of the messaging application to users based on predicted future activity can allow the messaging system 100 to promote communications between users and increase messaging activity via the messaging system 100.

Additionally, the campaign manager 110 can manage campaigns for use in targeting users. For example, the campaign manager 110 can communicate with the data storage manager 112 to obtain campaign information to provide to one or more users in a promotional campaign. To illustrate, after identifying a pair of users with a high activity score (i.e., a pair of users who are likely to engage in a highly active messaging thread), the campaign manager 110 can select a campaign that is likely to increase the messaging activity between the users.

According to one or more embodiments, the messaging system 100 can also include a data storage manager 112 for storing information associated with the messaging system 100. In particular, the data storage manager 112 can store information from one or more of the components of the messaging system 100 for use by one or more of the components. For example, the data storage manager 112 can communicate with the components to store information that the components of the messaging system 100 receive and/or generate. To illustrate, the data storage manager 112 can include, but is not limited to, interaction information 116, a user database 118, an activity score database 120, and a campaign database 122. One or more embodiments of the data storage manager 112 may store additional data associated with the messaging system 100.

As mentioned, the data storage manager 112 can include interaction information 116. In one or more embodiments, the interaction information 116 can include data associated with the interactions by users via the messaging system 100. Specifically, the interaction information 116 can include information associated with users' interactions that allows the messaging system 100 to estimate future activity between specified users. For example, the interaction information 116 can include, but is not limited to, the interactions by users, interaction types, content of interactions that include messages, targets/objects of the interaction, users affected by the interactions, associations of users related to the interactions.

According to one or more embodiments, the user database 118 can include information about users of the messaging system 100 in the messaging system 100. For example, the user database 118 can include information that allows the messaging system 100 to identify users and devices in communication with the social networking system. To illustrate, the user database 118 can communicate with the social graph 114, described below, to obtain user profiles, user identifiers, device identifiers, associations between users, relationships between users, and other information about the users that allows the score generator 106 to generate activity scores for pairs of users. In one or more embodiments, the user database 118 may store information separate from the social graph 114, for example, if the messaging system 100 do not include a social graph 114.

In at least some embodiments, the activity score database 120 can include activity scores for pairs of users in the social networking system. In particular, the score generator 106 can store activity scores in the activity score database 120 for use by the contact manager 108 or campaign manager 110. The activity score database 120 can store identification information with the activity scores to allow the contact manager 108 and the campaign manager 110 to modify users' contact lists and selectively target pairs of users for promotional campaigns, respectively.

For example, for a particular user of the social networking system, the activity score database 120 can store a table of activity scores corresponding to the particular users and corresponding paired users. Thus, when organizing the contact list for the particular user, the contact manger can access the table in the activity score database 120 to identify the activity scores corresponding to the users in the contact list. Similarly, the campaign manager 110 can access the table in the activity score database 120 to determine which pairs of users to target with a campaign.

In one or more embodiments, the data storage manager 112 can also include a campaign database 122 that includes campaign information. For example, the campaign database 122 can include promotional campaigns that promote the use of certain features of a messaging application. The campaign information can include messages, notifications, images, video, audio, or other content that allows the messaging system 100 to promote features of the messaging application. Additionally, the campaign information can include data that informs the campaign manager 110 when to provide certain information to identified users.

Although FIG. 1 describes the data storage manager 112 as including certain information, the data storage manager 112 can include additional, or alternative information to allow the messaging system 100 to manage users' contact lists and to promote features of the messaging application. Additionally, the data storage manager 112 may include any number of computing devices for storing data and communicating the data to the components of the social networking system. For example, the data storage manager 112 can include a distributed storage system with a plurality of storage devices, which may be accessible to the components of the messaging system 100 over a local network or an Internet connection.

Figure 2:
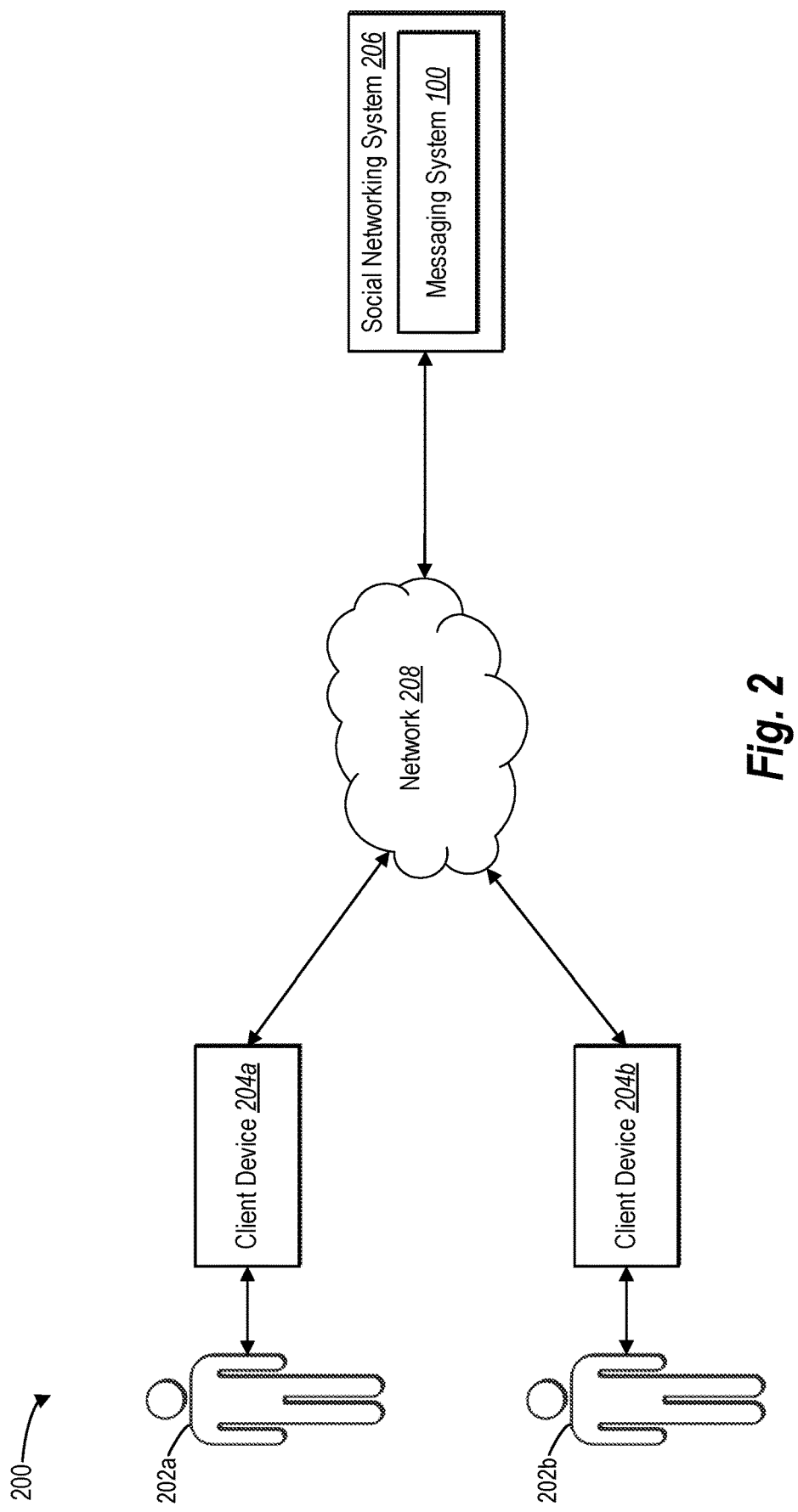
FIG. 2 illustrates a detailed schematic diagram of the server device(s) of FIG. 1 in accordance with one or more embodiments.

FIG. 2 is a schematic diagram illustrating an environment 200 in which the messaging system 100 operates in accordance with one or more embodiments. An overview of the environment 200 is described in relation to FIG. 2. Thereafter, a more detailed description of the components and processes of the messaging system are provided in relation to the remaining figures.

As illustrated by FIG. 2, the messaging system 100 can allow user 202a, user 202b, and up to any number of additional users (not shown) to interact using a corresponding number of client devices 204a, 204b. As further illustrated in FIG. 2, the client devices can communicate with a social networking system 206, which includes the messaging system 100, via a network 208. Although FIG. 1 illustrates a particular arrangement of the users 202a, 202b, the client devices 204a, 204b, the network 208, and the social networking system 206, various additional arrangements are possible. For example, the client devices 204a, 204b may directly communicate with the social networking system 206, bypassing the network 208. Additionally, the environment 200 may include additional or alternative components not shown.

Although FIG. 2 illustrates the environment 200 including the messaging system 100 on a social networking system 206, the messaging system 100 may be part of another device or system. For example, the messaging system 100 can be on a separate server device than the social networking system 206. Alternatively, the messaging system 100 can be distributed across a plurality of server devices and/or client devices implementing the social networking system 206 and/or other systems.

As briefly mentioned above, FIG. 2 shows that user 202a and user 202b can use client devices 204a and 204b, respectively, to communicate with one another via the messaging system 100 on the social networking system 206. For example, user 202a and user 202b can exchange electronic messages containing text, digital content (e.g., audio, images, video), location information, and other forms of data and information. For instance, the user 202a, using client device 204a, can compose a message intended for the user 202b. After composing the message, the user 202a can cause the client device 104a to send the message intended for the user 202b via the network 108 to the social networking system 206. The messaging system 100 on the social networking system 206 can identify the user 202b as the intended recipient, and forward the message to the client device 204b associated with the user 202b.

In addition to allowing the users to exchange electronic communications, the messaging system 100 can allow the users to interact with other content. In one or more embodiments, the messaging system 100 allows users to interact with content to, from, or relating to other users. For instance the messaging system 100 can allow user 202a to interact with content associated with user 202b within the social networking system 206, as will be explained in more detail below. Likewise, user 202b can interact with content associated with user 202a via the messaging system 100 on the social networking system 206, as will be explained in more detail below. As will be explained in more detail below, the messaging system 100 can communicate with each of the client devices 104a, 104b to provide content relating to an association between the users 202a, 202b.

While the messaging system 100 can facilitate communications between users 202a and 202b, the messaging system 100 can also facilitate communications between more than two users, such as a group of users. For example, the user 202a can send a message to user 202b, as well as to one or more additional users, such that all of the intended recipients receive the message. In one or more embodiments, the recipient users can interact with the message and/or other content related to the message from the user 202a. Furthermore, in one or more embodiments, the recipient users may also send messages to each other and/or to the user 202a in response to the received message.

As described herein, the messaging system 100 also facilitates interactions between users of the social networking system 206 based on activity scores associated with the users. Specifically, the messaging system 100 can identify interactions between the users 202a, 202b based on client device identifiers and/or account information associated with the users 202a, 202b from applications running on the client devices 204a, 204b. The messaging system 100 can use the interactions to determine activity scores and promote interactions between users 202a and 202b of the messaging system 100 with high activity scores. For example, the messaging system 100 can communicate with the client devices 204a, 204b to provide information to the users 202a, 202b to promote interactions between the users 202a, 202b based on an activity score associated with the users 202a, 202b.

Figure 9:
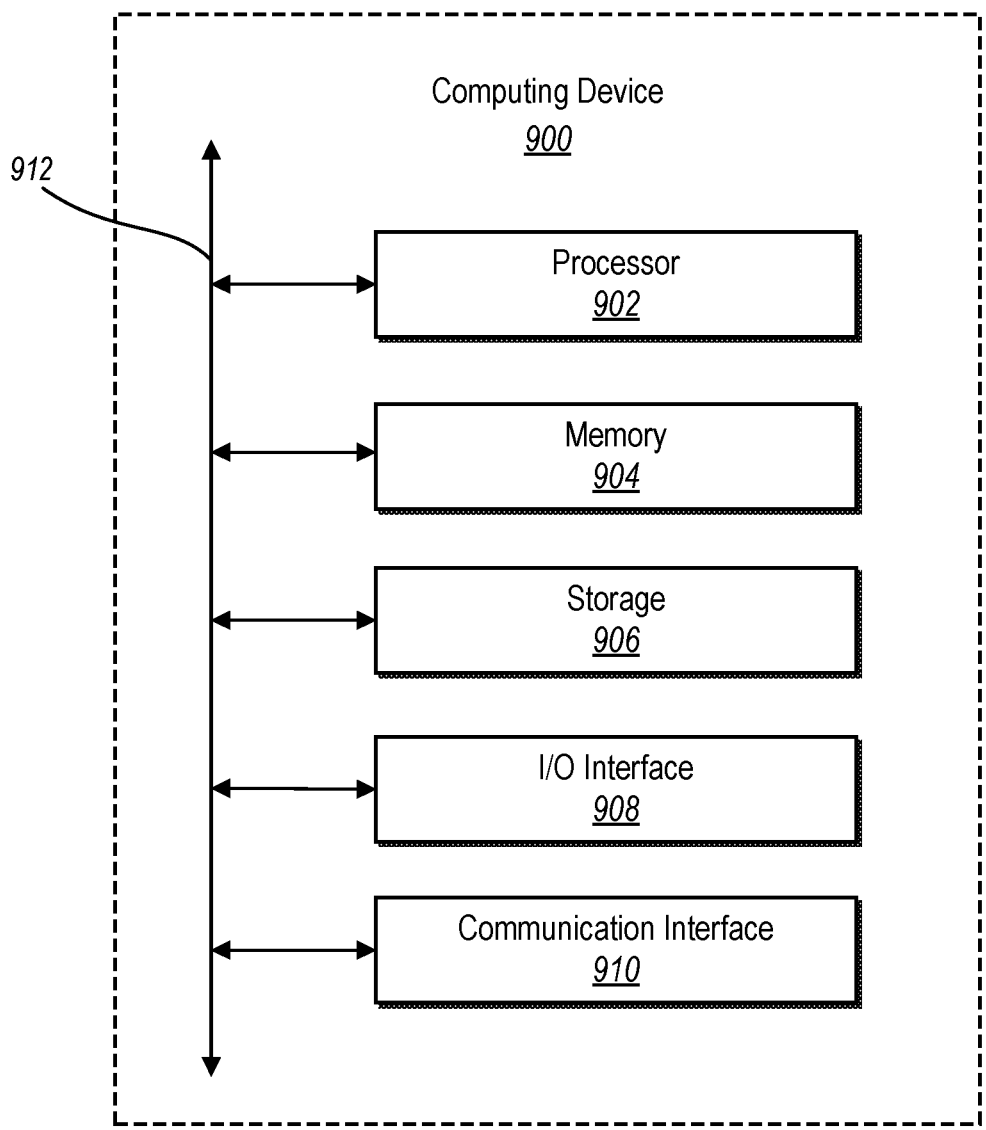
FIG. 9 illustrates a block diagram of an example computing device in accordance with one or more embodiments.

As mentioned above, and as FIG. 2 illustrates, the users 202a and 202b can interact with the client devices 204a and 204b, respectively. Examples of client devices include computing devices such as mobile devices (e.g., smartphones, tablets), laptops, desktops, or any other type of computing device. FIG. 9 and the corresponding description provide additional information regarding computing devices. Moreover, and as mentioned above, the client devices can communicate with each other and with the social networking system 206 through the network 208. In one or more embodiments, the network 208 includes the Internet or World Wide Web. The network 208, however, can include one or more private and/or public networks that use various communication technologies and protocols, as further described below with reference to FIG. 10.

As discussed, the systems and components described above with reference to FIGS. 1-2 can allow users of a messaging application to exchange messages via the messaging system 100. As illustrated and described below with reference to FIGS. 3, 4, and 5A-5D, the messaging system 100 can increase messaging activity by providing information to users within a messaging application based on activity scores related to associations between users. Specifically, the messaging system 100 can provide information to users with the purpose of encouraging the users to engage in highly active messaging threads.

As mentioned, increasing the number of users engaging in highly active threads can increase the overall messaging activity within the messaging system 100. Increased overall messaging activity can result in improved communications between users. The increased activity can also improve the effectiveness and presence of advertisements and increase advertising revenue within the messaging system 100 due to increased time spent using a messaging application.

In one or more embodiments, as briefly described previously, a highly active messaging thread is a thread that involves a high amount of active participation from users in the messaging system 100. For example, a highly active messaging thread can include a number of messages exchanged between two or more users that meets or exceeds a predetermined threshold. To illustrate, the messaging system 100 can set the predetermined threshold of messages at fifty messages sent by one or more users in the thread. Alternatively, the messaging system 100 can set the predetermined threshold at any number of messages as may serve a particular implementation. In one or more additional, or alternative, embodiments, the messaging system 100 can use a plurality of different thresholds for determining whether a messaging thread has high activity, nearly high activity, low activity, or other ranges of activity.

Additionally, a highly active messaging thread can include active participation for a certain amount of time. In particular, the messaging system 100 can identify a highly active messaging thread if the messaging thread includes activity on a predetermined number of days within a predetermined amount of time. For example, the messaging system 100 can set the predetermined number of days at four or more days within a thirty-day period. Activity can include messages exchanged between users within the messaging thread. In one or more alternative embodiments, the messaging system 100 can set the baseline for active participation at different thresholds, and can include other types of activity in determining whether a messaging thread is active (e.g., activity can include interactions with messages).

In one or more embodiments, the messaging system 100 can identify whether a user is highly active in a messaging thread based on individual activity for the user. Specifically, the messaging thread can identify that one of a plurality of users is actively participating in a highly active messaging thread if the user has sent more than a predetermined individual threshold, and participated for at least a predetermined number of days according to an individual participation threshold. For example, if the user has participated for at least four days within a thirty-day period and has sent at least fifty messages, the messaging system 100 can determine that the user is a highly active participant in the messaging thread.

To increase the number of users engaging in highly active messaging threads, the messaging system 100 can provide information to certain users that will encourage the users to engage in communications with certain other users. Specifically, the messaging system 100 can target users that are likely to engage in a highly active messaging thread. For example, the messaging system 100 can identify, for a first user, one or more other users with whom the first user is most likely to engage in a highly active messaging thread. The messaging system 100 can identify the other users based on preexisting relationships between the first user and the other users, as well as interactions of the first user and the other users.

For example, the messaging system 100 can assign activity scores to each association (e.g., pairing) between the first user and the other users based on interactions related to each pairing. Each activity score can be based on interactions related to the pairings between the first user and the other users, and can represent a likelihood that the first user and a second user will engage in a highly active messaging thread.

To illustrate, the messaging system 100 can identify a pair of users including the first user and a second user from a plurality of users having a relationship (e.g., a social networking connection) with the first user. According to one or more implementations, the second user can be a user from the first user's contact list. Alternatively, the second user can be in another list of users associated with the first user. For example, the second user can be a "friend" of the first user in the social networking system. In another embodiment, the messaging system 100 can identify the second user from a list of users that the first user might know based on other users in the first user's contact list or list of friends.

After identifying the association between the first user and the second user, the messaging system 100 can identify the interactions by the first user and the second user relating to the association between the first user and the second user. In particular, the messaging system 100 can identify interactions by the users in connection with messages or other content within the messaging system 100. For example, the interactions can include, but are not limited to, the following: private communications between the users (e.g., social networking messages, text messages, telephone calls); public communications involving the users (e.g., social networking posts and/or comments); read states of messages between the users; searches for the first user by the second user (or vice versa); selections of the first user in the search results, or number of times the first user appears in searches by the second user; interactions with notifications of activity relating to the users; length of time the users observe content associated with each other; number of social application requests between the users (e.g., such as gaming requests or other application requests within the social networking system 206); amount of time since the first user or the second user has "liked" or commented on content by the other user in the messaging system 100 on one or more application platforms (e.g., mobile and/or web interfaces); location check-ins by both users at the same location (either at the same time or different times); amount of time since both users have "liked" or commented on the same content; an action by one of the users to tag the other user in a content item owned by one of the users; number of times both users are tagged in the same content item; event invitations between the users; number of times the users have interacted with each other in a third-party application; and/or number and times of messages exchanged between the users. In additional, or alternative, embodiments, the messaging system 100 may identify all or only some of the above interactions, and may identify other interactions not listed above.

In one or more embodiments, the messaging system 100 can use the identified interactions related to the association between the first user and the second user to generate an activity score for the pair of users. For example, the messaging system 100 can generate the activity score by applying a logistic regression to the identified interactions to obtain a number representing the probability that the users will engage in highly active messaging activities. The messaging system 100 can adjust the weight and/or effect that the presence and/or absence of certain interactions have on activity scores. Thus, some interactions can influence the activity score more than other interactions.

Activity scores can be represented in accordance with any suitable scale or numbering system for representing a likelihood of future highly active messaging threads. For example, an activity score can include a decimal number between zero and one, with one representing a 100% chance that the users will engage in highly active messaging activities, and zero representing a 0% chance. Alternatively, the messaging system 100 can utilize an activity score having a different scale for representing the likelihood of highly active messaging activities.

According to at least some embodiments, the messaging system 100 can generate the activity score by weighting values associated with the interactions. Specifically, one or more values associated with the interactions may have a greater affect on the likelihood that the users participate in a highly active messaging thread than other interactions. Thus, the messaging system 100 can apply a greater weight to the more important interactions and a lower weight to the less important interactions. Additionally, each of the weights may vary in proportion to the effect the corresponding interactions have on the probability of future activity.

In one or more embodiments, the activity score can correspond to a period of time from the time the messaging system 100 generates the activity score. In particular, the activity score represents the likelihood that the users will actively engage in communications for a period of time from the moment at which the messaging system 100 generates the activity score. For example, the activity score can represent a prediction of communications between the users for the next week. In at least some instances, the activity score can grow stale or irrelevant to the pair of users after a certain amount of time has passed, at which time the activity score can expire if the activity score is not updated based on new interactions. Alternatively, the messaging system 100 can continuously update the activity score to maintain a current activity score for the users. Specifically, the messaging system 100 can update the activity score in response to detecting new interactions related to the association between the users, thereby updating the time period to which the activity score corresponds.

After assigning an activity score to a pair of users, the messaging system 100 can monitor the activity for each of the users to determine whether the users participate in a highly active messaging thread with each other. If the users participate with each other in a highly active messaging thread within the time that the activity score is valid, the messaging system 100 can set an activity status of the messaging thread to indicate that the messaging thread is highly active. If the users do not participate with each other in a highly active messaging thread within the valid time of the activity score, the messaging system 100 can set the activity status of the messaging thread to inactive. The messaging system 100 can then use the observed statuses of the messaging thread to improve the predicted likelihood for the users.

For example, the messaging system 100 can use machine learning to improve the algorithm that generates the activity score. The messaging system 100 can utilize machine-learning to train a model based on prior interactions between users. Specifically, the messaging system 100 can identify interactions between users that have participated in highly active messaging threads in the past. The messaging system 100 can then use this data to train the model to generate scores indicating the likelihood that two individuals will engage in highly active messaging threads in the future.

In one or more embodiments, the messaging system 100 determines relationships between interactions and highly active messaging threads. In particular, the messaging system 100 trains the model to acknowledge identify relationships between interactions and highly active messaging threads based on the interactions that are frequently present between users that have engaged in highly active messaging threads in the past. The messaging system 100 can train the model based on the determined relationships between interactions and the likelihood of highly active messaging threads. By training the model accordingly, the messaging system 100 is able to attribute a higher likelihood of future highly active messaging threads based on detected interactions between users. For example, training the machine-learning model can involve weighting the possible interactions based on the correlation between the possible interactions and highly active messaging threads.

The messaging system 100 can continue to train the model as additional data becomes available. In particular, the messaging system 100 can continue to use machine-learning principles to refine the model based on the accuracy of the model in predicting future highly active messaging threads. As such, the messaging system 100 can more accurately predict highly active messaging threads in the future. For example, if the messaging system 100 detects a new highly active messaging thread between two users and identifies other interactions between the two users, the machine-learning model can adjust the weighting of interactions to reflect the additional data. To illustrate, if the new data indicates an additional interaction that is indicative of the potential for highly active messaging threads, the messaging system 100 can adjust the model to increase activity scores if the additional interaction is present. The messaging system 100 can additionally increase and/or decrease the effects of other interactions on generated activity scores based on additional data. Using the foregoing principles, the messaging system 100 can train the model to accurately predict the likelihood of future highly active messaging threads based on the presence and/or absence of interactions between users.

To take advantage of the information that the activity score for a pair of users provides, the messaging system 100 can provide information to the users in accordance with the activity score. In particular, the messaging system 100 can provide information to users who are most likely to engage in highly active messaging threads. For example, the messaging system 100 can improve the organization of a user's contact list, as described in FIG. 3. Additionally, or alternatively, the messaging system 100 can determine when to promote certain features of a messaging application and for which users the promotional campaigns are likely to be most effective, as described in FIGS. 4-5D. Thus, the messaging system 100 can provide timely information to the users who are most likely to benefit from the information.

Figure 3:
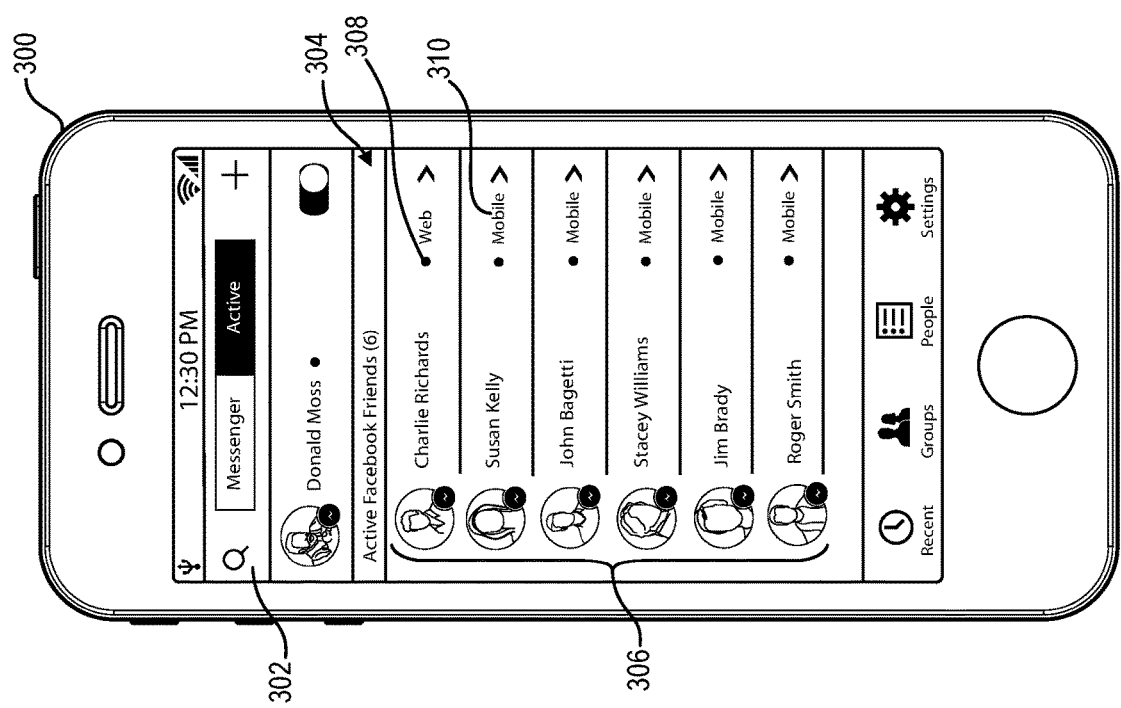
FIG. 3 illustrates a user interface displaying a contact list in accordance with one or more embodiments.

As mentioned, the messaging system 100 can organize a contact list of a user based on interactions related to the associations between the user and the user's contacts. The messaging system 100 can use one or more of the components of FIGS. 1 and 2 to provide one or more graphical user interfaces. For example, the components can allow a user to interact with a collection of display elements for a variety of purposes. FIG. 3 and the description that follows illustrate an example embodiment of the user interface and features that the messaging system 100 can use as part of a messaging application in accordance with general principles described above.

For example, FIG. 3 illustrates a GUI provided by a messaging application to facilitate electronic messaging between two or more users of the messaging system 100. In some examples, a client device (i.e., client device 104a, 104b) can implement and or communicate with at least some of the components of the messaging system 100. For example, FIG. 3 illustrates a client device 300 that may include a messaging application that communicates with the communication manager 102 of the messaging system 100. As illustrated, the client device 300 can be a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The client device 300 can include any of the features and components described below in reference to a computing device 900 of FIG. 9. As illustrated in FIG. 3, the client device 300 includes a touchscreen display 302 that can display or provide user interfaces and by way of which user input may be received and/or detected. As used herein, a "touchscreen display" refers to the display of a touchscreen device. In one or more embodiments, a touchscreen device may be a client device with at least one surface upon which a user may perform touch gestures (e.g., a laptop, a tablet computer, a personal digital assistant, a media player, a mobile phone). Additionally or alternatively, the client device 300 may include any other suitable input device, such as a touch pad or those described below in reference to FIG. 9.

As noted previously, the messaging system 100 can include a messaging application that allows users to communicate with each other via their respective client devices. FIG. 3 illustrates a contacts user interface 304 that the messaging application provides on the touchscreen 302. The contacts user interface 304 can provide contact list 306 of a user ("Donald") of the client device 300. In particular, the contacts user interface 304 can list "friends" or contacts with which the user is connected or associated within the messaging system 100. For example, the friends or contacts can include other users with which the user has established relationships in a social networking system.

As mentioned, the messaging system 100 can organize the contact list 306 for providing to the client device 300 based on the activity scores corresponding to each of the users in the contact list 306. In particular, the messaging system 100 ranks a plurality of users in the contact list 306 of the user of the client device 300 using the corresponding activity scores. Ranking the plurality of users allows the messaging system 100 to position the plurality of users in the contact list 306 in a way that allows the user to more easily find other users that are likely to engage with the user in highly active messaging threads.

For example, the messaging system 100 can position users with higher activity scores in more prominent positions of the contact list 306. Specifically, the messaging system 100 organizes the contact list 306 such that the users associated with the highest activity scores located toward the top of the contact list 306 in the contact user interface. To illustrate, the contact user interface of FIG. 3 illustrates a user "Charlie Richards" at the top of the contact list 306, indicating that the activity score related to the association between Charlie Richards and the user of the client device 300 is higher than activity scores corresponding to other users in the contact list 306. Similarly, the users associated with the lowest activity scores can be located toward the bottom of the contact list 306. According to alternative embodiments, the contact list 306 may include a different organization with different prominent positions.

According to other embodiments, the messaging system 100 can use additional criteria to determine how to list the users in the contact list 306. For example, the messaging system 100 can compare the activity scores of one or more pairs of users to a predetermined threshold. Based on the comparison, the messaging system 100 can determine where to place users within the contact list 306 of the user of the client device 300 or even whether to include the users in the contact list 306. For example, the messaging system 100 can include users that meet or exceed the predetermined threshold in the contact list 306, and exclude users that do not meet or exceed the predetermined threshold from the contact list 306.

Alternatively, one or more embodiments of the messaging system 100 place users into different groups within the contact list 306. For example, the messaging system 100 can identify a first set of users for which the corresponding activity scores meet or exceed the threshold and a second set of users for which the corresponding activity scores do not meet the threshold. The messaging system 100 can then organize the first set of users into a first group within the contact list 306 and the second set of users into a second group within the contact list 306. The first group and second group may be visibly distinguishable, allowing the user to more easily find users that are likely to engage in a highly active messaging thread with the user. Additionally, the messaging system 100 may apply additional sorting methods to the separate groups, such as listing the users within the groups alphabetically.

In one or more embodiments, the messaging system 100 organizes the contact list 306 based on user input in addition to the interactions by the users. For example, the messaging system 100 can include whether a user is a "favorites" of the user of the client device 300 in the calculation of the activity score and/or the organization of the contact list 306. Additionally, or alternatively, the messaging system 100 can identify whether the user has explicitly indicated whether to include or exclude a specific user from the contact list 306.

According to one or more embodiments, the messaging system 100 updates the contact list 306 in response to one or more additional interactions related to the association between the user of the client device 300 and a user in the contact list 306. For example, the messaging system 100 can update one or more activity scores based on the additional interactions and reorganize the contact list 306 according to the updated activity scores. To illustrate, if an updated activity score corresponding to a first user is now higher than an activity score corresponding to a second user that was previously listed above the first user, the messaging system 100 can change the position of the first user to a position above the second user in the contact list 306. Accordingly, the messaging system 100 can reorganize the contact list 306 in any manner based on recalculated activity scores for any of the users in the contact list 306.

In one or more embodiments, the contacts user interface 304 further provides one or more statuses of each of the contacts. For example, the contacts user interface 304 can indicate whether a given contact or co-user is active (e.g., logged into the messaging application, connected to the Internet, or recently performed an action using the messaging application) by way of a first status indicator 308. The first status indicator 308 can comprise a graphical user interface object such as an icon. In one embodiment, the first status indicator 308 includes a dot of a first color (e.g., green) next to a name of each co-user who is active. Along related lines, the first status indicator 308 can also include a dot of a second color (e.g., grey) next to users who are inactive.

The contacts user interface 304 can indicate the type of device a contact or co-user is currently using via a device indicator 310. The device indicator 310 can include a graphical user interface object such as an icon or description. For example, as shown the device indicator 310 can include the words "Web" indicating that a co-user is active or logged into the messaging application using a personal computer. Along similar lines, the device indicator 310 can include the word "Mobile" to indicate that a given contact is active or logged into the messaging application using a mobile device, such as a mobile phone. Additionally or alternatively, the device indicator 310 can indicate a brand or model of the client device 300 of a given co-user.

One or more embodiments of the messaging application receive notifications or indications of the statuses of the contacts associated with the user of the client device 300 from the messaging system 100. For example, the messaging applications can send notifications or status updates to the messaging system 100 to indicate when the messaging applications are active or online. The messaging system 100 can then send the statuses of contacts associated with a given user to the client device(s) associated with the given user.

In one or more additional embodiments, the messaging system 100 also ranks users in other locations or interfaces of the messaging application. In particular, the messaging system 100 can display a plurality of users according to their corresponding activity scores within a list of search results. Additionally, the messaging system 100 can display a plurality of users as autofill suggestions within a type-ahead text field. For example, as a user begins typing a name into a search field or a contact field, the messaging system 100 can display a ranked list of suggested users based on the activity scores associated with the users.

In one or more embodiments, the messaging system 100 allows a user to search for messaging threads in which the user has previously participated. For example, the messaging application may include an interface, such as a messaging history, that allows a user to search for previous messaging threads or content of previous messaging threads. The messaging application can display results for messaging threads based on the activity scores associated with the participants of the messaging threads. Thus, messaging threads involving users with high activity scores may be positioned at the top of the results.

Figure 4:
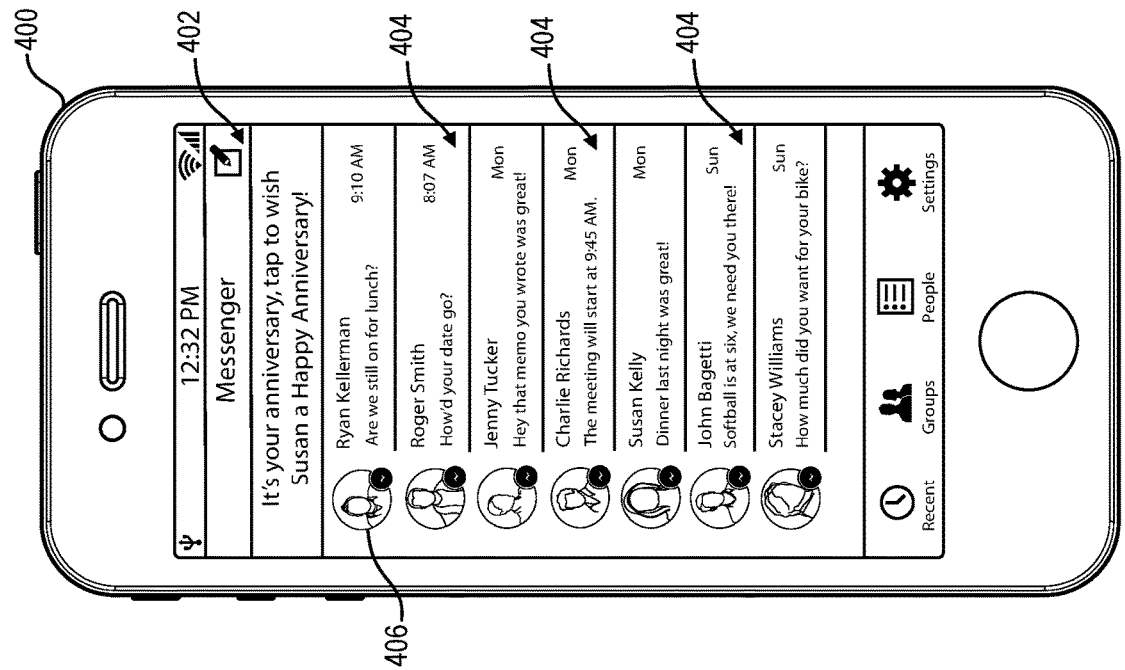
FIG. 4 illustrates a user interface displaying a messaging thread list in accordance with one or more embodiments.

As previously described, the messaging system 100 can also promote features of the messaging application to users based on the activity scores corresponding to the users. The messaging system 100 can provide information in a promotional campaign to promote the features of the messaging application within various different interfaces of the messaging application. For example, FIG. 4 illustrates a client device 400 displaying a threads list interface 402 that allows users to see a plurality of messaging threads 404 involving the user of the client device 400. Specifically, the threads list interface 402 can display messaging threads 404 in which the user has sent and/or received messages.

In one or more embodiments, the messaging system 100 provides information in the threads list interface 402 to promote one or more features of the messaging application to the user. To illustrate, the messaging system 100 can display a banner 406 within the threads list interface 402 with information related to one or more features of the messaging application. The banner 406 can include information with the purpose of encouraging the user to use the feature of the messaging application and engage in a messaging thread with a particular user.

For example, the messaging system 100 can promote the use of the messaging features in connection with a particular event. To illustrate, the messaging system 100 can recommend initiating a conversation in connection with an event associated with a particular user. FIG. 4 illustrates a banner 406 with the message, "It's your anniversary! Tap to wish Michelle a happy anniversary today!" The messaging system 100 can then recommend that the user wish his wife a happy anniversary using the messaging features of the messaging application.

In one or more embodiments, the messaging system 100 provides information with which the user can interact to access the promoted feature. Specifically, as mentioned, the messaging system 100 can identify a pair of users for promoting a particular feature of the messaging application based on the activity score corresponding to the pair of users. For example, the messaging system 100 can select a user associated with the highest activity score from the contact list 306 of the user of the client device 400. Thus, the messaging system 100 can selectively promote a feature of the messaging application to specifically identified individuals, rather than spamming all users with promotional information for the feature. Selectively promoting the feature of the messaging application can be more effective and less intrusive than spamming all of the users of the messaging system 100 with promotional information that is not likely to result in messaging activity between certain users.

After identifying the users, the messaging system 100 can select or generate promotional information to provide to the user of the client device 400 and/or to the other identified user. In one or more embodiments, the messaging system 100 can select promotional information from a plurality of predefined promotional messages. For example, the messaging system 100 can select a predefined promotional message that promotes the usage of a new feature that the users may use in a messaging thread with each other based on the activity score. The predefined promotional message can recommend the new feature to the users and/or teach the users how to use the new feature within the messaging application.

In one or more alternative embodiments, the messaging system 100 generates new promotional information that is customized to the users. Specifically, the messaging system 100 uses the identity of the users, the current time (e.g., hour, day, or month), and/or the relationship between the two users to determine how to promote a feature to the users. For example, the messaging system 100 can determine that the users share an anniversary, as shown in FIG. 4, and generate a message that tells one or more of the identified users to send each other messages within a new messaging thread. In another example, the messaging system 100 can send a birthday notification to one or more friends of a user based on the activity scores corresponding to the users. Thus, the messaging system 100 can provide customized messages to target specific events and/or interests of the users in relation to one or more of the features of the messaging application.

In one or more embodiments, the promotional information can appear as a banner 406 that overlays on top of a list of messaging threads 404, as in FIG. 4. In one or more alternative embodiments, the messaging system 100 provides the promotional information to the client device 400 for displaying in another portion of the threads list interface 402 or in another interface of the messaging application. To illustrate, the messaging system 100 can provide promotional information within a messaging thread interface (as described in relation to FIGS. 5B-5D), the contacts list interface, or in any other interface within the messaging application, as may serve a particular embodiment. Alternatively, the messaging system 100 may promote features of the messaging application using video, sound, images, highlighting or other methods of promoting the use of a particular feature of the messaging application.

After providing the promotional information to the user of the client device 400, the user of the client device 400 can interact with the promotion to initiate a new messaging thread with another user or resume an existing messaging thread. To illustrate, if the user clicks or taps the banner 406 in the threads list interface 402 of FIG. 4, the messaging application can initiate a new conversation between the user and the identified recipient. The user can then engage in a messaging thread with the user based on the promotion information in the banner 406. In at least some instances, the resulting messaging thread can be a highly active messaging thread.

In additional, or alternative, embodiments, a promotional campaign is successful based on whether the users engaged in a communications as a result of one or more promotional messages. For example, if the user initiates a messaging thread with a user identified in a promotional message, the messaging system 100 can determine that the promotional campaign is successful. In other embodiments, a promotional campaign may be successful if the users engage in a highly active messaging thread as a result of one or more promotional messages. In one or more alternative implementations, a promotional campaign may be successful if the users engage in a messaging thread that does not become a highly active messaging thread. In at least some embodiments, a promotional campaign is considered successful if the users interact in any type of engagement, regardless of length or content.

According to various embodiments, the messaging system 100 can also provide promotional information in a plurality of messages in connection with a single promotional campaign. For example, a promotional campaign may include a plurality of messages to better aid a user in learning and using one or more features of the messaging application. To illustrate, a promotional campaign can provide a plurality of messages to the user, each message at different times or in different interfaces. FIGS. 5A-5D illustrate a client device 500 that displays example user interfaces with messages to encourage a user to use one or more features of the messaging application.

Figure 5B:
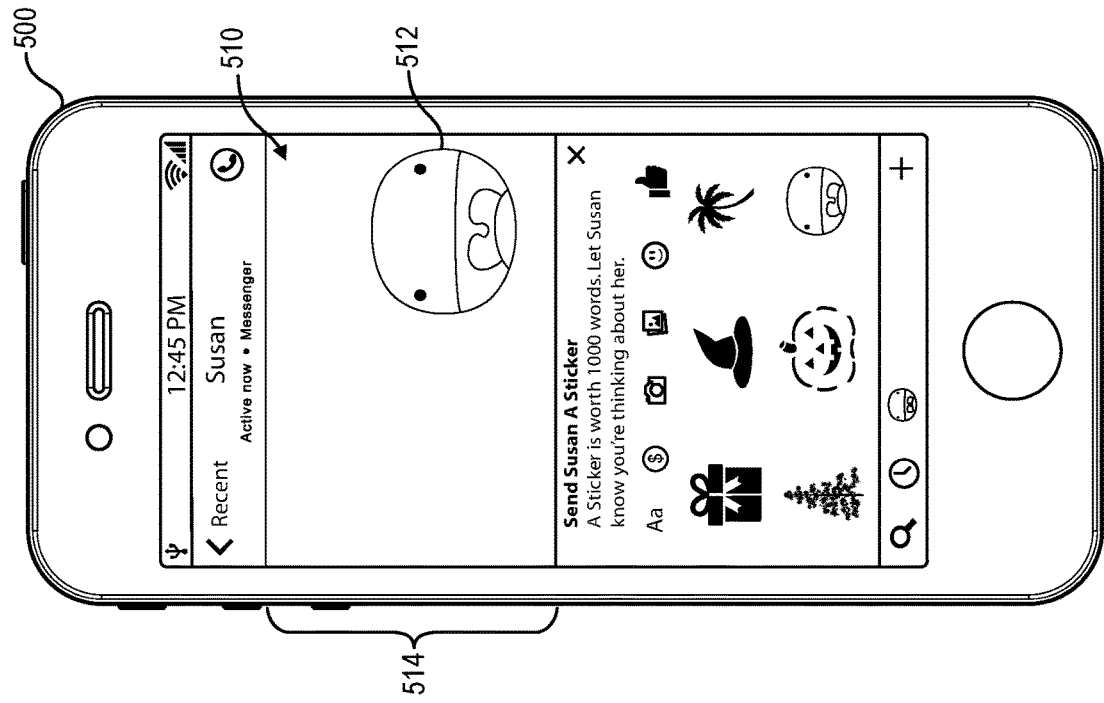
FIGS. 5A-5D illustrate user interfaces for promotional campaigns within a messaging application in accordance with one or more embodiments.
Figure 5A:
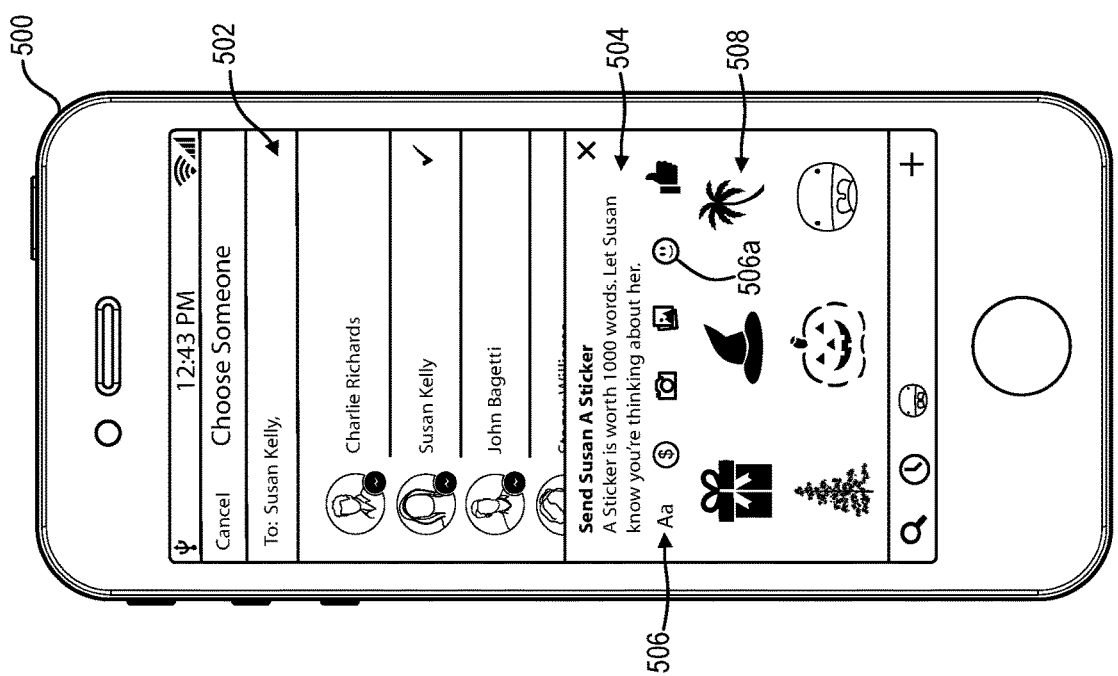

FIG. 5A illustrates an embodiment of a contacts user interface 502 including a message 504 associated with a promotional campaign. Specifically, the message 504 includes promotional information encouraging a user to send a message to another user using a specific feature of the messaging application. To illustrate, FIG. 5A illustrates a message 504 that promotes the use of "stickers" with an identified user ("Susan") in a messaging thread. In one or more embodiments, the message 504 can be the first of a plurality of messages directed to the usage of the "stickers" feature of the messaging application.

As recited previously, the messaging system 100 can identify the pair of users (including the user of the client device 500) for providing promotional information based on an activity score associated with the pair of users. If the activity score associated with the pair of users meets or exceeds a predetermined threshold, the messaging system 100 can select the pair of users for promoting one or more features of the messaging application to the users. For example, the messaging system 100 can promote one or more features that are most likely to encourage the users to engage in messaging activities. To illustrate, the messaging system 100 can determine that Susan frequently uses stickers in messaging threads. The messaging system 100 can then select or generate a promotional campaign to promote, to the user of the client device 500, the use of stickers in a messaging thread with Susan.

After selecting or generating the promotional campaign, the messaging system 100 can provide promotional information from the promotional campaign to the client device 500. In one or more embodiments, the messaging system 100 can generate a message 504 including the promotional information to display within an interface of the messaging application. For example, the messaging system 100 can include the message 504 in a banner, overlay, or pop-up message in an interface of the messaging application. In another example, the messaging system 100 can generate a notification message associated with the messaging application to provide within a notification menu of the client device 500.

As illustrated in FIG. 5A, when presenting the promotional content to the user, the messaging application displays the message 504 above a toolbar 506. Additionally, the messaging application can automatically display or highlight one or more features that are part of the promotional campaign. For example, for a campaign that promotes the usage of "stickers" in messaging threads, the messaging application can present a sticker selection list 508 with one or more "stickers" available for selection and insertion into the messaging thread. Alternatively, the messaging application can visually highlight a sticker toolbar option 506a that opens the sticker selection list 508 in response to the user selecting the sticker toolbar option 506 or in response to the user selecting the message 504 with the promotional information.

In response to the user selecting the feature promoted by the campaign, the messaging system 100 can perform one or more operations associated with the selected feature in the messaging application. For example, as illustrated in the messaging thread interface 510 of FIG. 5B, in response to the user selecting a "sticker" to post in a message to the other user identified by the promotional information, the messaging system 100 can input the selected "sticker" into a message 512 in a messaging thread 514 involving the user of the client device 500 and the identified user. In one or more embodiments, the messaging thread 514 can be a new messaging thread. In alternative embodiments, the messaging thread 514 can be an existing messaging thread with the "sticker" as the newest message 512 by the user in the messaging thread.

According to one or more embodiments, the messaging system 100 can determine whether the campaign results in increased messaging activity between the users. In particular, the messaging system 100 can maintain a count of the number of messages between the users after providing the promotional information to the user. For example, the messaging system 100 can determine whether the user selected the message 504 or used the feature and initiated a messaging thread 514 in response to the message 504 or usage of the feature.

In one or more implementations, if the number of messages in the messaging thread 514 resulting from the message or the use of the feature is above a threshold, the messaging system 100 can determine that the promotional campaign is successful. For example, if the promotional information results in a highly active messaging thread, the messaging system 100 can determine that the promotional campaign is successful. Based on the promotional campaign being successful, the messaging system 100 may not present any additional promotional information to the user in connection with the specific promotional campaign. Alternatively, the messaging system 100 may deliver one or more additional messages to the user to reinforce the usage of the specific feature or to promote additional features.

If the number of messages resulting from the messages in the messaging thread 514 resulting from the message or the use of the feature is below a threshold, the messaging system 100 can determine that the promotional campaign is not yet successful. In response to such a determination, the messaging system 100 can determine that one or more additional messages can improve the likelihood of a successful campaign. Thus, the messaging system 100 can make a dynamic determination of how many messages with promotional information to provide to the user based on the resulting messaging activity.

Figure 5D:
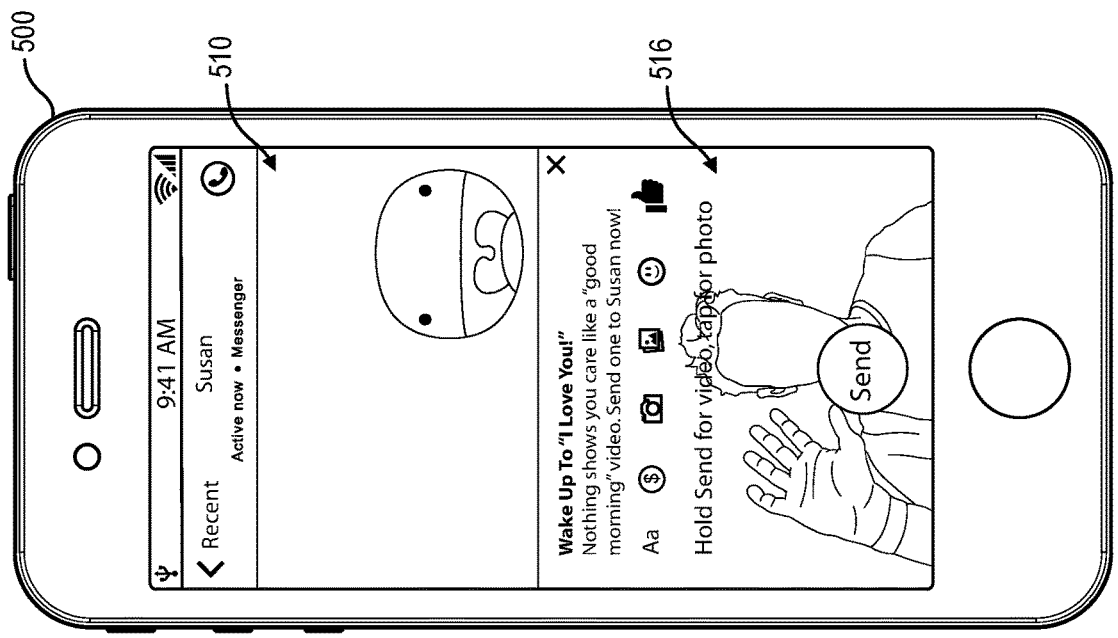
Figure 5C:
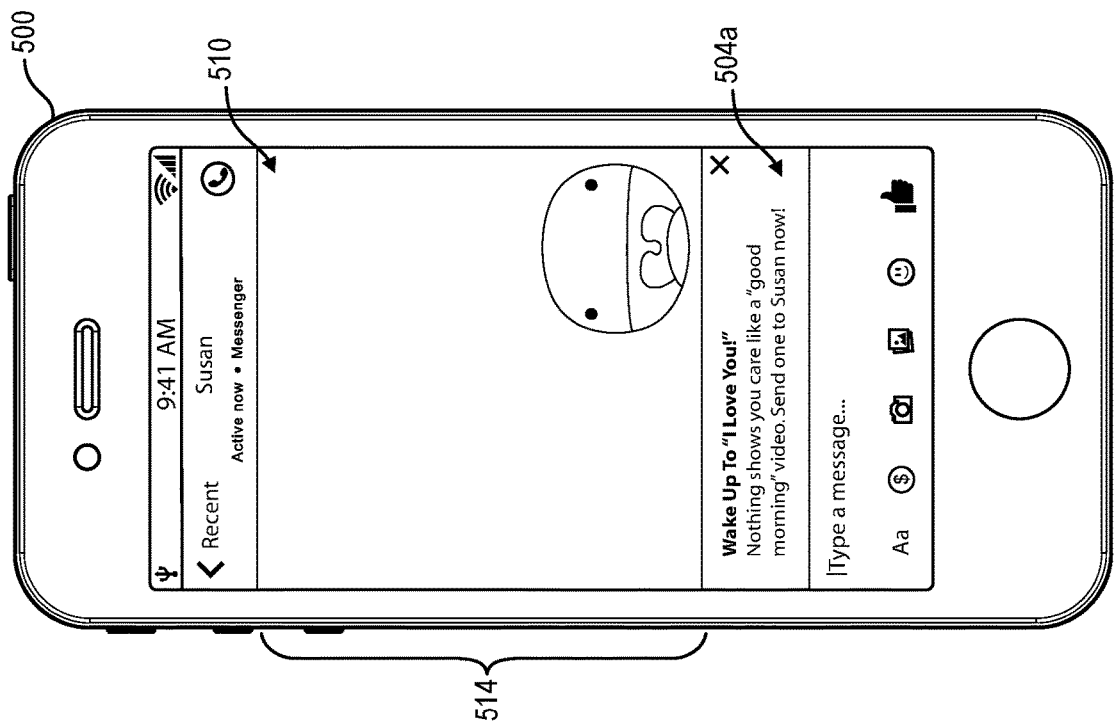

In one or more embodiments, the messaging system 100 can provide an additional message to the client device 500 of the user in connection with the promotional campaign. Specifically, in response to a determination that the messaging activities of the users did not meet or exceed a threshold, the messaging system 100 can provide additional promotional information to the client device 500. For example, FIG. 5C illustrates a second message 504a containing promotional information from the promotional campaign within the messaging thread interface 510. In particular, the second message 504a includes promotional information about a second feature (i.e., sending videos) that the user can use in messaging threads.

According to at least some embodiments, the messaging system 100 can promote the second feature in the second message 504a to further encourage the user to initiate a messaging thread with the identified user or continue the previous messaging thread 514. Specifically, by promoting the use of another feature, the messaging system 100 can provide new ways for the users to communicate with each other. Encouraging new ways to communicate may increase the likelihood that the users engage in a highly active messaging thread. Alternatively, the messaging system 100 can promote the same feature in a plurality of different messages.

As illustrated in FIG. 5C, when the messaging system 100 provides the second message to the client device 500, the messaging application can display the second message 504a within the messaging thread interface 510. For example, the messaging thread interface 510 can display the second message in an overlay or pop-up message, similar to the first message 504 in the threads list interface 402. To illustrate, the second message 504a can include a banner that says, "Nothing shows you care like a 'good morning' video. Send one now!" Because the banner appears in the messaging thread interface 510 containing the messaging thread 514 with the recipient, the banner may not include the recipient's name. Alternatively, if the second message 504a appears in another messaging thread or in another interface, the banner may indicate to send the video to the recipient as part of the earlier promotional campaign.

When the user selects the second message 504a, or the second feature highlighted by the second message, the messaging application can allow the user to use the second feature in connection with the messaging thread 514. FIG. 5D illustrates the messaging thread interface 510 containing a video interface 516 (e.g., inside a composition area of the messaging thread interface) corresponding to the second message 504a. The video interface 516 can allow the user to capture video using the client device 500 and send the video to the recipient within the messaging thread 514. For instance, the video interface 516 can display the live video of the user while the user captures the video, and then embed the captured video in the messaging thread 514 for display in the messaging thread interface 510.

In one or more embodiments, the messaging system 100 can provide a plurality of messages in connection with a promotional campaign at designated times. In particular, the messaging system 100 can determine that the promotional campaign can be most effective if the messages are provided at specific intervals to remind the user to communicate with the specified user using one or more features of the messaging application. For example, the promotional campaign can include a plurality of messages provided on different days. To illustrate, a promotional campaign to encourage a user to send "stickers" on a first day, videos on a second day, a specific message on a third day, etc. Additionally, the messaging system 100 can encourage the user to send other media (e.g., images, audio) or text within the messaging application, and can provide a plurality of messages over the course of several consecutive days or predetermined time intervals. Alternatively, the messaging system 100 can provide the messages at other time intervals or dynamic time intervals, as may serve a particular embodiment.

As described the messaging system 100 provides promotional information based on the activity levels that represents the likelihood of at least two users to engage in highly active messaging threads with each other. Although the activity score is described herein with reference to two users, the messaging system 100 can calculate an activity score for more than two users. Consequently, the messaging system 100 can create groups or perform other operations related to specified groups based on the corresponding activity scores, including selecting or generating promotional information to the groups. For example, the messaging system 100 can provide promotional information to a first group while not providing the promotional information (or providing different promotional information) to a second group based on the activity scores of each group. Tailoring the promotional activity to each group can encourage higher messaging activities between the members of each group.

Figure 7:
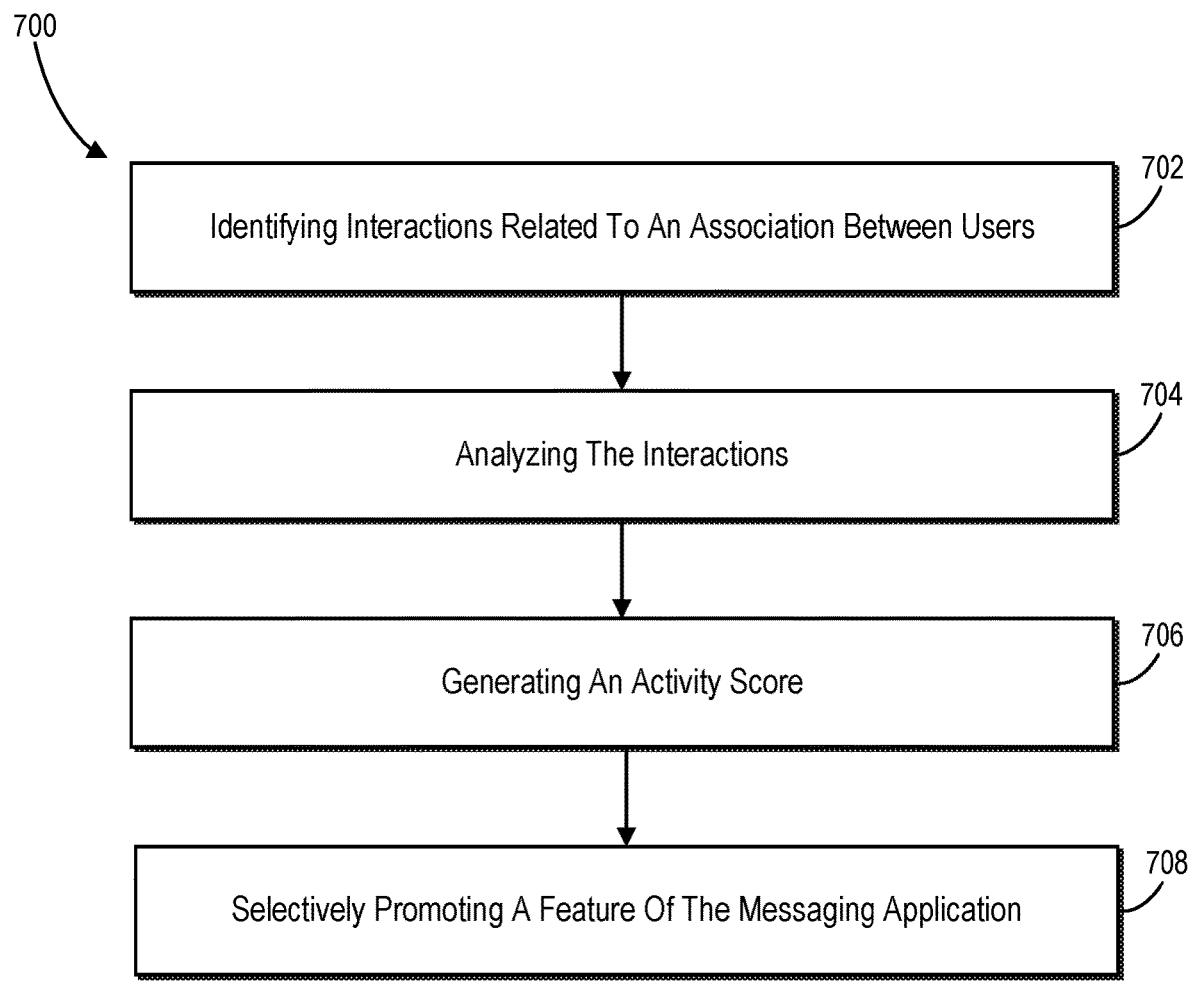
FIG. 7 illustrates a flowchart of a series of acts in a method of promoting features of a messaging application in accordance with one or more embodiments.
Figure 8:
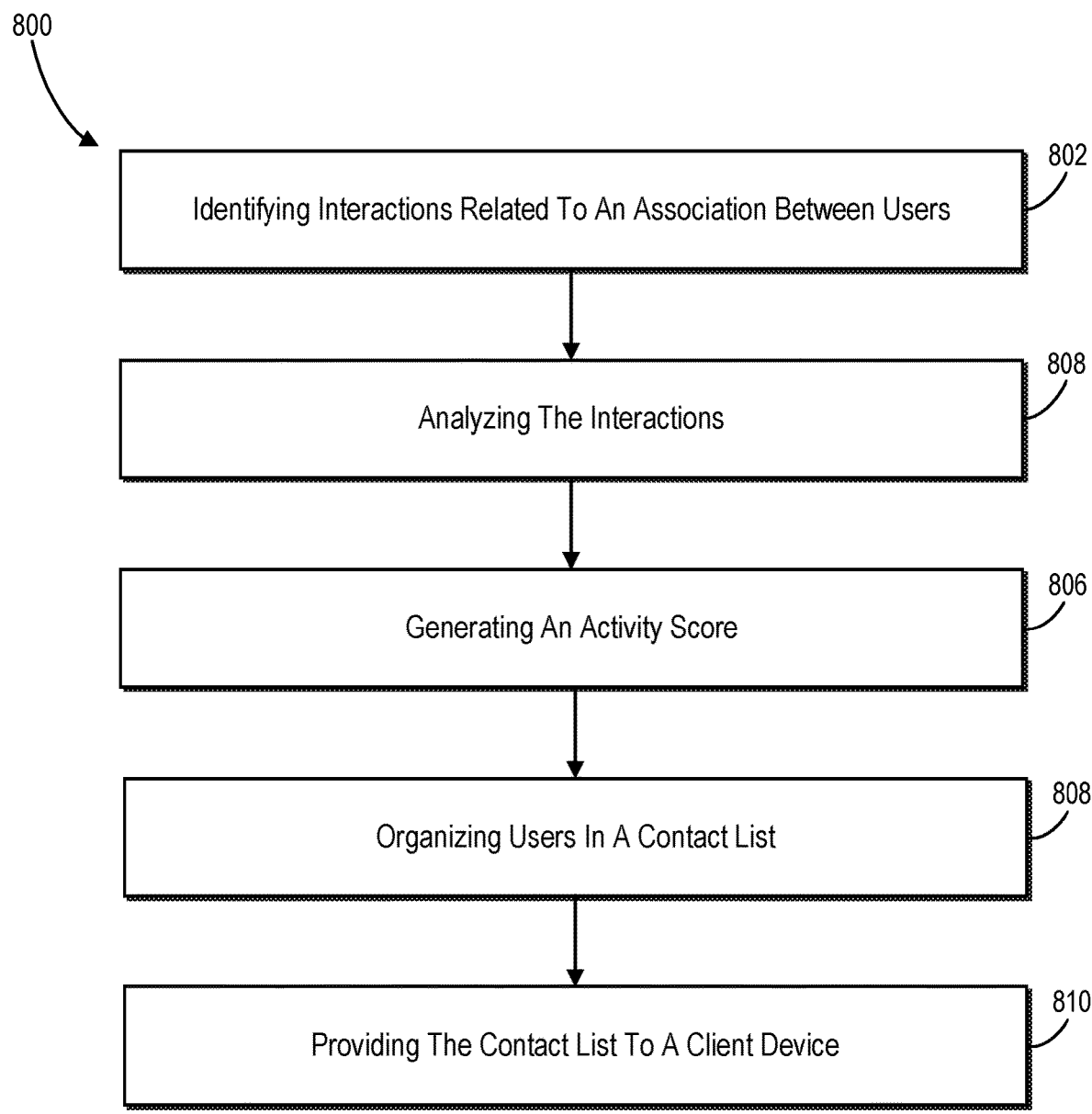
FIG. 8 illustrates a flowchart of a series of acts in a method of organizing a contact list in accordance with one or more embodiments.

FIGS. 1-5D, the corresponding text, and the examples, provide a number of different systems and devices for increasing messaging activity between users of a messaging system. In addition to the foregoing, embodiments can be described in terms of flowcharts comprising acts and steps in a method for accomplishing a particular result. For example, FIGS. 6-8 illustrate flowcharts of exemplary methods in accordance with one or more embodiments.

Figure 6:
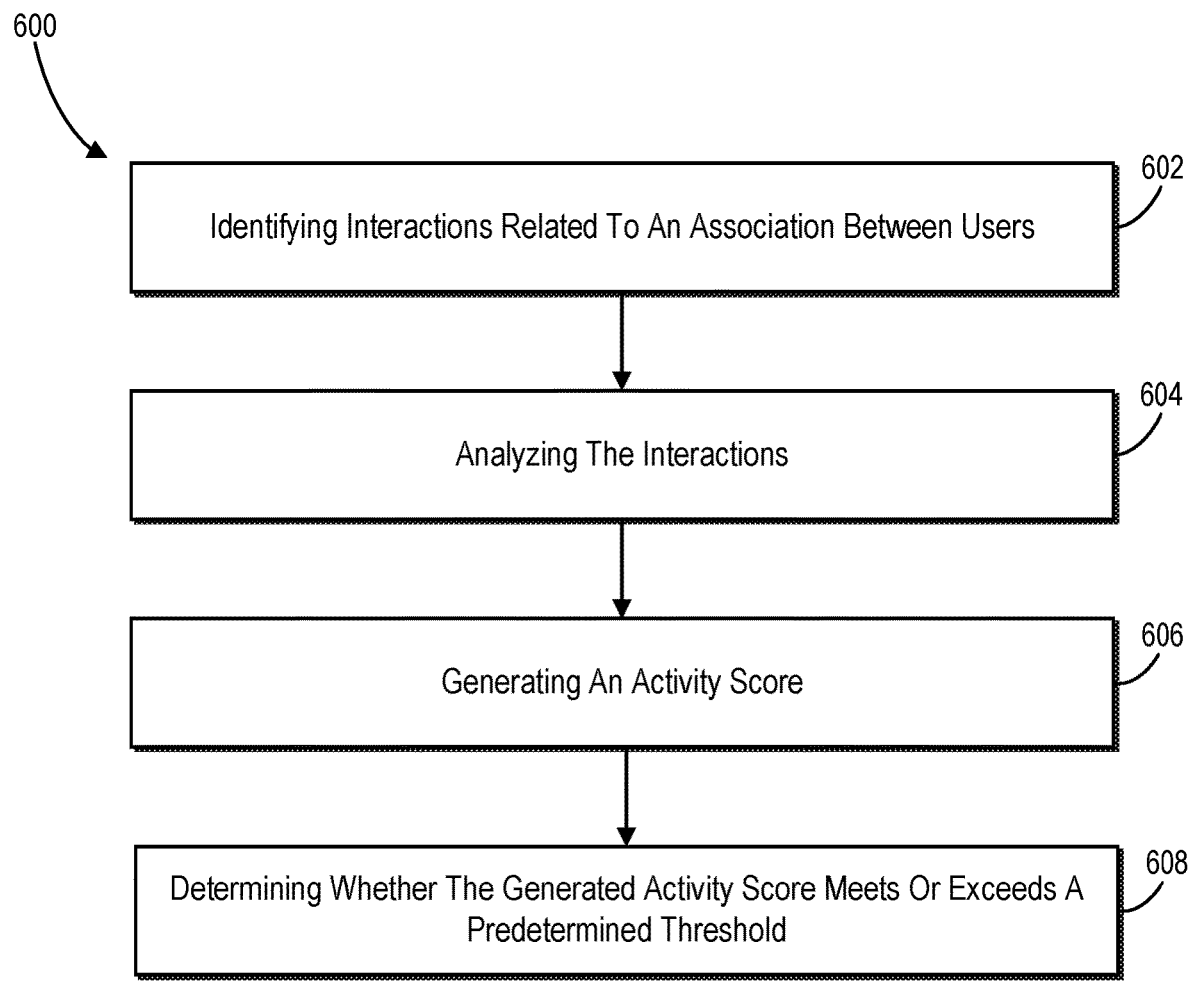
FIG. 6 illustrates a flowchart of a series of acts in a method of predicting messaging activity between users in accordance with one or more embodiments.

FIG. 6 illustrates a flow chart of a method 600 of predicting messaging activity between users of a messaging system 100. The method 600 includes an act 602 of identifying interactions related to an association between users. For example, act 602 involves identifying interactions related to an association between a first user and a second user of an electronic messaging system 100. To illustrate, the interactions can include binary labels corresponding to actions by the first user or the second user within a messaging application. Additionally, or alternatively the interactions can include communications between the first user and the second user, interactions with communications, interactions with notifications associated with the first user or the second user, or interactions with content associated with the first user or the second user.

The method 600 also includes an act 604 of analyzing the interactions. For example, act 604 involves analyzing the interactions related to the association between the first user and the second user. To illustrate, act 604 can involve applying a logistic regression to the interactions related to the association between the first user and the second user. Act 604 can involve determining an effect that the interactions have on a likelihood of future activity between the first user and the second user.

Additionally, the method 600 includes an act 606 of generating an activity score. For example, act 606 involves generating, based on the analyzed interactions, an activity score representing a likelihood that the first user and the second user will engage in a highly active messaging thread. To illustrate, act 606 can involve applying different weights to at least some of the interactions related to the association between the first user and the second user. For example, act 606 can involve applying different weights to the interactions based on an effect of each interaction on a likelihood of future messaging activity between the first user and the second user.

Additionally, act 606 can involve determining that a predetermined period of time has passed since the generation of the activity score, and invalidating the activity score. Additionally, act 606 can further involve generating a new activity score in response to invalidating the activity score. Furthermore, act 606 can involve generating the activity score to represent the likelihood that the first user and the second user will engage in a highly active messaging thread within the predetermined period of time.

Furthermore, the method 600 includes an act 608 of determining whether the generated activity score meets or exceeds a predetermined threshold. For example, act 608 can involve determining that the generated activity score meets or exceeds the predetermined threshold. The method 600 can include performing an operation related to the association between the first user and the second user within the messaging application in response to the generated activity score meeting or exceeding the predetermined threshold. Additionally, the method 600 can include providing information related to the association between the first user and the second user within the messaging application.

As part of act 608, or as an additional act, the method 600 can include an act of identifying one or more additional interactions related to the association between the first user and the second user. Additionally, the method 600 can include an act of updating the activity score based on the one or more additional interactions. For example, the updating the activity score can involve updating the activity score at predefined intervals. Alternatively, updating the activity score can involve updating the activity score in response to identifying the one or more additional interactions.

FIG. 7 illustrates a flowchart of a series of acts in a method 700 of promoting features of promoting features of a messaging application. The method includes an act 702 of identifying interactions related to an association between users. For example, act 702 involves identifying interactions related to an association between a first user and a second user of an electronic messaging system 100. To illustrate, the interactions can include binary labels corresponding to actions by the first user or the second user within a messaging application. Additionally, or alternatively the interactions can include communications between the first user and the second user, interactions with communications, interactions with notifications associated with the first user or the second user, or interactions with content associated with the first user or the second user.

The method 700 also includes an act 704 of analyzing the interactions. For example, act 704 involves analyzing the interactions related to the association between the first user and the second user. To illustrate, act 704 can involve applying a logistic regression to the interactions related to the association between the first user and the second user. Act 604 can involve determining an effect that the interactions have on a likelihood of future activity between the first user and the second user.

The method 700 further includes an act 706 of generating an activity score. For example, act 706 involves generating, based on the analyzed interactions, an activity score representing a likelihood that the first user and the second user will engage in a highly active messaging thread. To illustrate, act 706 can involve applying different weights to at least some of the interactions related to the association between the first user and the second user. For example, act 706 can involve applying different weights to the interactions based on an effect of each interaction on a likelihood of future messaging activity between the first user and the second user.

Additionally, the method 700 includes an act 708 of selectively promoting a feature of the messaging application. For example, act 708 involves selectively promoting a feature of the messaging application relating to the association between the first user and the second user based on the generated activity score. To illustrate, act 708 can involve providing a recommendation to the first user to initiate a new messaging thread with the second user using the feature. Additionally, act 708 can involve providing a notification to the first user to send a message to the second user in connection with a specific event associated with the second user.

Act 708 can also involve identifying a present time and a relationship between the first user and the second user. Act 708 can further involve providing a recommendation to the first user to initiate a new messaging thread with the second user based on the current time or the identified relationship.

Furthermore, act 708 can involve providing a recommendation to the first user in a first user interface of the messaging application to use a feature within a second user interface of the messaging application. Act 708 can also involve receiving communication information related to the association between the first user and the second user from a third-party application, and selectively promoting the feature of the messaging application based on the generated activity score and the received communication information.

As part of act 708, or as an additional act, the method 700 can include identifying a plurality of users associated with activity scores that meet or exceed a predetermined threshold. The method 700 can also include providing a notification to the plurality of users to send a message to the second user in connection with the specific event associated with the second user.

FIG. 8 illustrates a flowchart of a series of acts in a method 800 of organizing a contact list 306 in a messaging application. The method includes an act 802 of identifying interactions related to an association between users. For example, act 802 involves identifying interactions related to an association between a first user and a second user of an electronic messaging system. To illustrate, the interactions can include binary labels corresponding to actions by the first user or the second user within a messaging application. Additionally, or alternatively the interactions can include communications between the first user and the second user, interactions with communications, interactions with notifications associated with the first user or the second user, or interactions with content associated with the first user or the second user.

Additionally, the method 800 includes an act 804 of analyzing the interactions. For example, act 804 involves analyzing the interactions related to the association between the first user and the second user. To illustrate, act 804 can involve applying a logistic regression to the interactions related to the association between the first user and the second user. Act 604 can involve determining an effect that the interactions have on a likelihood of future activity between the first user and the second user.

The method 800 further includes an act 806 of generating an activity score. For example, act 806 involves generating, based on the analyzed interactions, an activity score representing a likelihood that the first user and the second user will engage in a highly active messaging thread. To illustrate, act 806 can involve applying different weights to at least some of the interactions related to the association between the first user and the second user. For example, act 806 can involve applying different weights to the interactions based on an effect of each interaction on a likelihood of future messaging activity between the first user and the second user.

The method 800 also includes an act 808 of organizing users in a contact list 306. For example, act 808 involves organizing a plurality of users in a contact list 306 comprising the second user based on the generated activity score. To illustrate, act 808 can involve ranking the plurality of users based on activity scores corresponding to a plurality of associations between the first user and the plurality of users. Additionally, act 808 can involve positioning a user with a highest activity score in a most prominent position of the contact list 306.

As part of act 808, or as an additional act, the method 800 can include generating a plurality of activity scores corresponding to a plurality of associations between the first user and the plurality of users, and organizing the plurality of users in the contact list 306 based on the generated plurality of activity scores. Act 808 can also involve excluding a third user from the contact list 306 based on an activity score representing a likelihood that the first user and the third user will engage in a highly active messaging thread.

Additionally, the method 800 can include acts of determining that a plurality of activity scores for a first set of users from the plurality of users meet or exceed a predetermined threshold, and determining that a plurality of activity scores for a second et of users from the plurality of users do not meet the predetermined threshold. The method can also include organizing the first set of users into a first group within the contact list 306 and the second of users into a second group within the contact list 306.

The method 800 can include an act of identifying one or more additional interactions related to the association between the first user and the second user. The method 800 can further include an act of updating the activity score based on the one or more additional interactions, and changing a position of the second user in the contact list 306 based on the updated activity score.

The method 800 also includes an act 810 of providing the contact list 306 to a client device 300. For example, act 810 can involve providing the contact list 306 to a client device 300 of the first user. To illustrate, act 810 can involve providing the contact list 306 in a contacts user interface of a messaging application at the client device 300. Act 810 can involve organizing the contact list 306 at one or more servers, and sending the organized contact list from the one or more servers to the client device 300. Alternatively, act 810 can involve sending activity scores for a plurality of users in the contact list 306 to the client device 300, and organizing the contact list 306 at the client device 300 based on the activity scores for the plurality of users.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 9 illustrates a block diagram of exemplary computing device 900 that may be configured to perform one or more of the processes described above. One will appreciate that one or more computing devices such as the computing device 900 may implement the message system 100. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 1106.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touchscreen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (MC) or network adapter for communicating with an Ethernet or other wire-based network or a wireless MC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social-networking system. A social-networking system may enable its users (such as persons or organizations) to interact with the system and with each other. As mentioned above, the system 100 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 10:
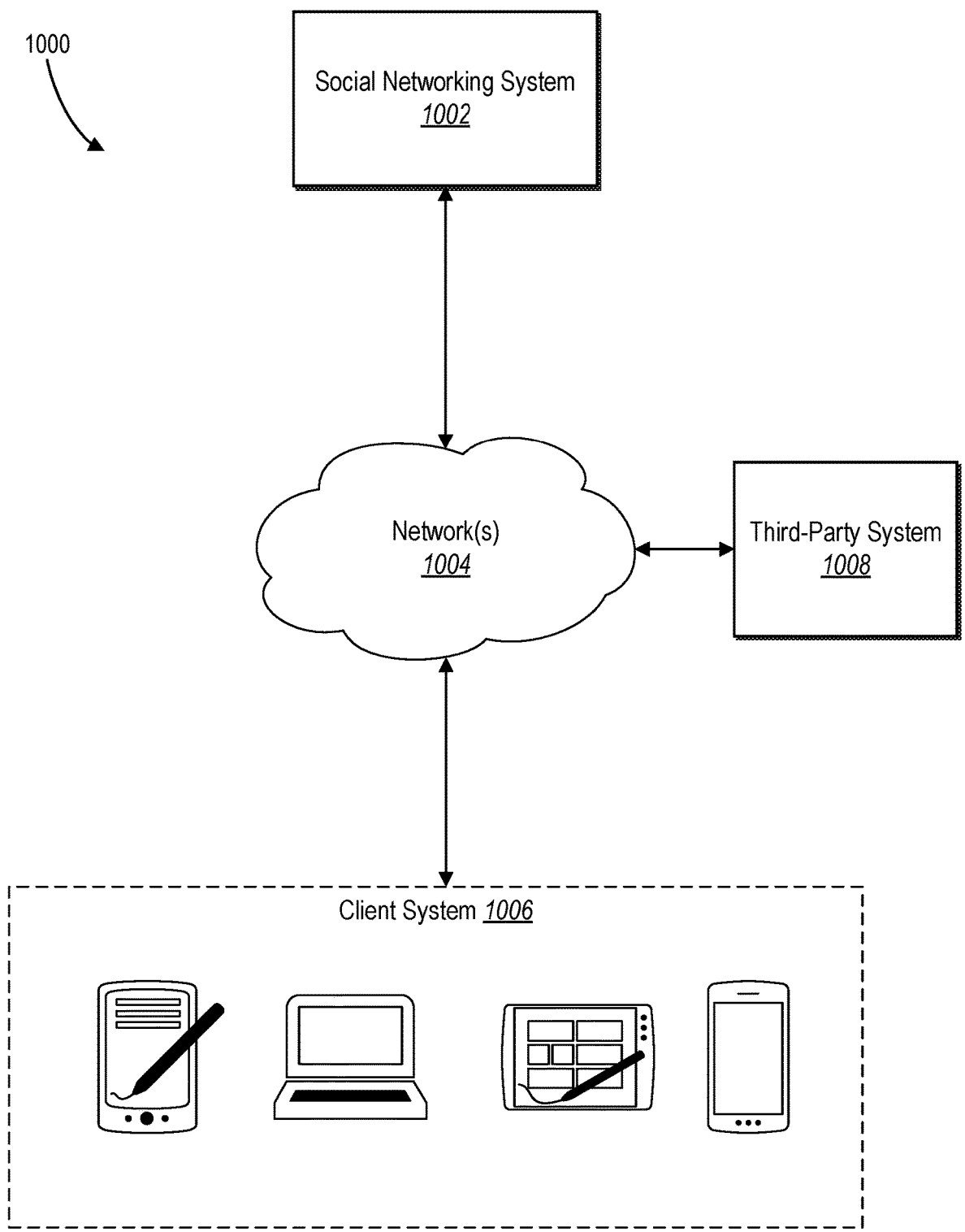
FIG. 10 illustrates an example network environment of a social-networking system in accordance with one or more embodiments.

FIG. 10 illustrates an example network environment 1000 of a social-networking system. Network environment 1000 includes a client system 1006, a social-networking system 1002, and a third-party system 1008 connected to each other by a network 1004. Although FIG. 10 illustrates a particular arrangement of client system 1006, social-networking system 1002, third-party system 1008, and network 1004, this disclosure contemplates any suitable arrangement of client system 1006, social-networking system 1002, third-party system 1008, and network 1004. As an example and not by way of limitation, two or more of client system 1006, social-networking system 1002, and third-party system 1008 may be connected to each other directly, bypassing network 1004. As another example, two or more of client system 1006, social-networking system 1002, and third-party system 1008 may be physically or logically co-located with each other in whole or in part. Moreover, although FIG. 10 illustrates a particular number of client systems 1006, social-networking systems 1002, third-party systems 1008, and networks 1004, this disclosure contemplates any suitable number of client systems 1006, social-networking systems 1002, third-party systems 1008, and networks 1004. As an example and not by way of limitation, network environment 1000 may include multiple client system 1006, social-networking systems 1002, third-party systems 1008, and networks 1004.

This disclosure contemplates any suitable network 1004. As an example and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect client system 1006, social-networking system 1002, and third-party system 1008 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client system 1006 may be an electronic device including hardware, software, or embedded logic components or a combination of two or more such components and capable of carrying out the appropriate functionalities implemented or supported by client system 1006. As an example and not by way of limitation, a client system 1006 may include any of the computing devices discussed above in relation to FIG. 9. A client system 1006 may enable a network user at client system 1006 to access network 1004. A client system 1006 may enable its user to communicate with other users at other client systems 1006.

In particular embodiments, client system 1006 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1006 may enter a Uniform Resource Locator (URL) or other address directing the web browser to a particular server (such as server, or a server associated with a third-party system 1008), and the web browser may generate a Hyper Text Transfer Protocol (HTTP) request and communicate the HTTP request to server. The server may accept the HTTP request and communicate to client system 1006 one or more Hyper Text Markup Language (HTML) files responsive to the HTTP request. Client system 1006 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1002 may be a network-addressable computing system that can host an online social network. Social-networking system 1002 may generate, store, receive, and send social-networking data, such as, for example, user-profile data, concept-profile data, social-graph information, or other suitable data related to the online social network. Social-networking system 1002 may be accessed by the other components of network environment 1000 either directly or via network 1004. In particular embodiments, social-networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1006, a social-networking system 1002, or a third-party system 1008 to manage, retrieve, modify, add, or delete, the information stored in data store.

In particular embodiments, social-networking system 1002 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 1002 may provide users of the online social network the ability to communicate and interact with other users. In particular embodiments, users may join the online social network via social-networking system 1002 and then add connections (e.g., relationships) to a number of other users of social-networking system 1002 whom they want to be connected to. Herein, the term "friend" may refer to any other user of social-networking system 1002 with whom a user has formed a connection, association, or relationship via social-networking system 1002.

In particular embodiments, social-networking system 1002 may provide users with the ability to take actions on various types of items or objects, supported by social-networking system 1002. As an example and not by way of limitation, the items and objects may include groups or social networks to which users of social-networking system 1002 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1002 or by an external system of third-party system 1008, which is separate from social-networking system 1002 and coupled to social-networking system 1002 via a network 1004.

In particular embodiments, social-networking system 1002 may be capable of linking a variety of entities. As an example and not by way of limitation, social-networking system 1002 may enable users to interact with each other as well as receive content from third-party systems 1008 or other entities, or to allow users to interact with these entities through an application programming interfaces (API) or other communication channels.

In particular embodiments, a third-party system 1008 may include one or more types of servers, one or more data stores, one or more interfaces, including but not limited to APIs, one or more web services, one or more content sources, one or more networks, or any other suitable components, e.g., that servers may communicate with. A third-party system 1008 may be operated by a different entity from an entity operating social-networking system 1002. In particular embodiments, however, social-networking system 1002 and third-party systems 1008 may operate in conjunction with each other to provide social-networking services to users of social-networking system 1002 or third-party systems 1008. In this sense, social-networking system 1002 may provide a platform, or backbone, which other systems, such as third-party systems 1008, may use to provide social-networking services and functionality to users across the Internet.

In particular embodiments, a third-party system 1008 may include a third-party content object provider. A third-party content object provider may include one or more sources of content objects, which may be communicated to a client system 1006. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1002 also includes user-generated content objects, which may enhance a user's interactions with social-networking system 1002. User-generated content may include anything a user can add, upload, send, or "post" to social-networking system 1002. As an example and not by way of limitation, a user communicates posts to social-networking system 1002 from a client system 1006. Posts may include data such as status updates or other textual data, location information, photos, videos, links, music or other similar data or media. Content may also be added to social-networking system 1002 by a third-party through a "communication channel," such as a newsfeed or stream.

In particular embodiments, social-networking system 1002 may include a variety of servers, sub-systems, programs, modules, logs, and data stores. In particular embodiments, social-networking system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1002 may also include suitable components such as network interfaces, security mechanisms, load balancers, failover servers, management-and-network-operations consoles, other suitable components, or any suitable combination thereof. In particular embodiments, social-networking system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1002 to one or more client systems 1006 or one or more third-party system 1008 via network 1004. The web server may include a mail server or other messaging functionality for receiving and routing messages between social-networking system 1002 and one or more client systems 1006. An API-request server may allow a third-party system 1008 to access information from social-networking system 1002 by calling one or more APIs. An action logger may be used to receive communications from a web server about a user's actions on or off social-networking system 1002. In conjunction with the action log, a third-party-content-object log may be maintained of user exposures to third-party-content objects. A notification controller may provide information regarding content objects to a client system 1006. Information may be pushed to a client system 1006 as notifications, or information may be pulled from client system 1006 responsive to a request received from client system 1006. Authorization servers may be used to enforce one or more privacy settings of the users of social-networking system 1002. A privacy setting of a user determines how particular information associated with a user can be shared. The authorization server may allow users to opt in to or opt out of having their actions logged by social-networking system 1002 or shared with other systems (e.g., third-party system 1008), such as, for example, by setting appropriate privacy settings. Third-party-content-object stores may be used to store content objects received from third parties, such as a third-party system 1008. Location stores may be used for storing location information received from client systems 1006 associated with users. Advertisement-pricing modules may combine social information, the current time, location information, or other suitable information to provide relevant advertisements, in the form of notifications, to a user.

Figure 11:
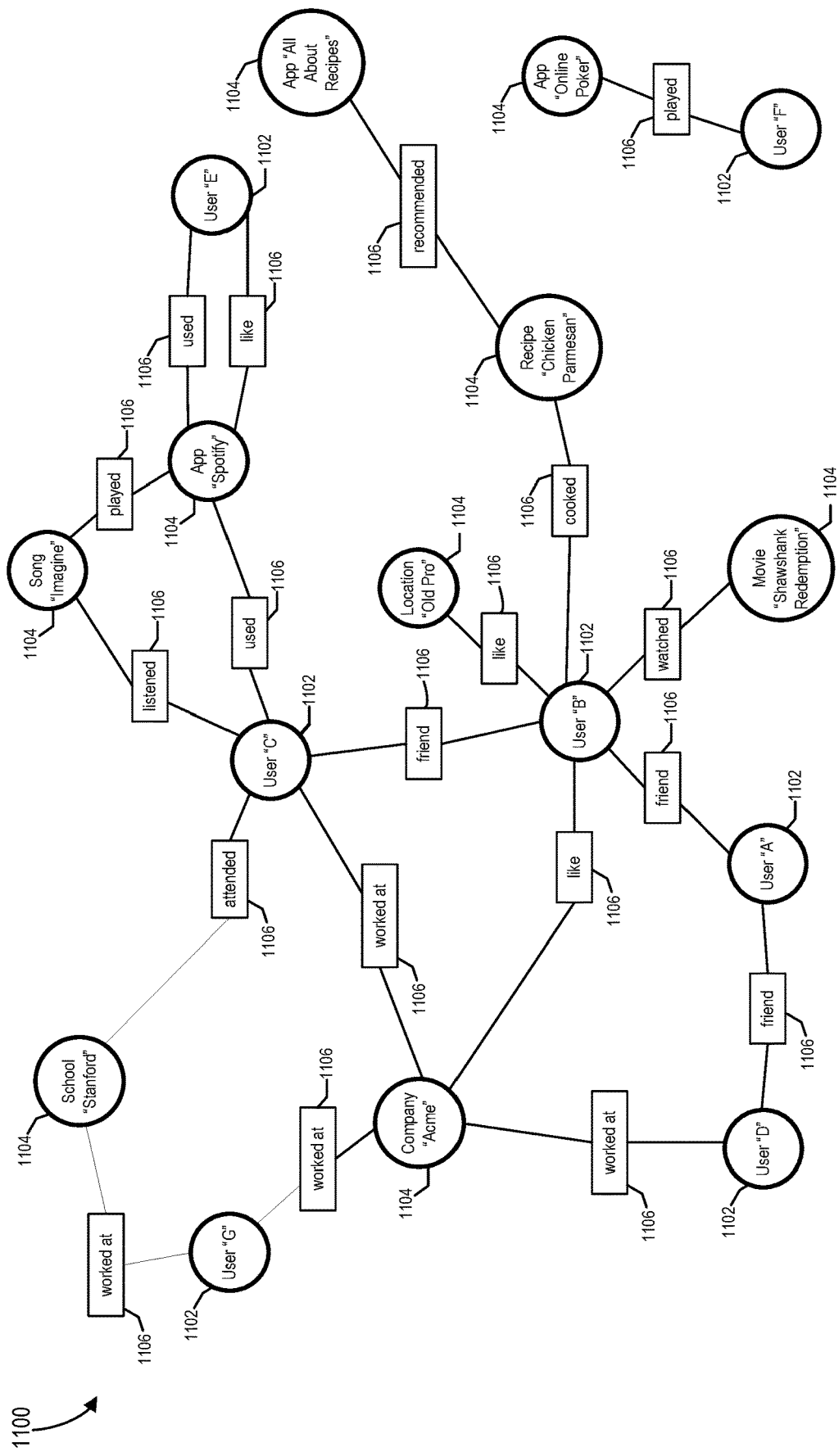
FIG. 11 illustrates an example social graph for a social-networking system in accordance with one or more embodiments.

FIG. 11 illustrates example social graph 1100. In particular embodiments, social-networking system 1002 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1002, client system 1006, or third-party system 1008 may access social graph 1100 and related social-graph information for suitable applications. The nodes and edges of social graph 1100 may be stored as data objects, for example, in a data store (such as a social-graph database). Such a data store may include one or more searchable or query able indexes of nodes or edges of social graph 1100.

In particular embodiments, a user node 1102 may correspond to a user of social-networking system 1002. As an example and not by way of limitation, a user may be an individual (human user), an entity (e.g., an enterprise, business, or third-party application), or a group (e.g., of individuals or entities) that interacts or communicates with or over social-networking system 1002. In particular embodiments, when a user registers for an account with social-networking system 1002, social-networking system 1002 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1002. In particular embodiments, a user node 1102 may be associated with information provided by a user or information gathered by various systems, including social-networking system 1002. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1002 or a third-party website associated with a web-application server); an entity (such as, for example, a person, business, group, sports team, or celebrity); a resource (such as, for example, an audio file, video file, digital photo, text file, structured document, or application) which may be located within social-networking system 1002 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social-networking system 1002. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1002. Profile pages may also be hosted on third-party websites associated with a third-party server 1008. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1008. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1006 to send to social-networking system 1002 a message indicating the user's action. In response to the message, social-networking system 1002 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1002 may send a "friend request" to the second user. If the second user confirms the "friend request," social-networking system 1002 may create an edge 1106 connecting the first user's user node 1102 to the second user's user node 1102 in social graph 1100 and store edge 1106 as social-graph information in one or more of data stores. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1002 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1002 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1002 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1002 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1006) may indicate that he or she likes the concept represented by the concept node 1104 by clicking or selecting a "Like" icon, which may cause the user's client system 1006 to send to social-networking system 1002 a message indicating the user's liking of the concept associated with the concept-profile page. In response to the message, social-networking system 1002 may create an edge 1106 between user node 1102 associated with the user and concept node 1104, as illustrated by "like" edge 1106 between the user and concept node 1104. In particular embodiments, social-networking system 1002 may store an edge 1106 in one or more data stores. In particular embodiments, an edge 1106 may be automatically formed by social-networking system 1002 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1002). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1002 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1002) or RSVP (e.g., through social-networking system 1002) to an event associated with the advertisement. In addition or as an alternative, an advertisement may include social-networking-system context directed to the user. As an example and not by way of limitation, an advertisement may display information about a friend of the user within social-networking system 1002 who has taken an action associated with the subject matter of the advertisement.

In particular embodiments, social-networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1002 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1002 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1002 may calculate a coefficient based on a user's actions. Social-networking system 1002 may monitor such actions on the online social network, on a third-party system 1008, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 1002 may calculate a coefficient based on the user's actions with particular types of content. The content may be associated with the online social network, a third-party system 1008, or another suitable system. The content may include users, profile pages, posts, news stories, headlines, instant messages, chat room conversations, emails, advertisements, pictures, video, music, other suitable objects, or any combination thereof. Social-networking system 1002 may analyze a user's actions to determine whether one or more of the actions indicate an affinity for subject matter, content, other users, and so forth. As an example and not by way of limitation, if a user may make frequently posts content related to "coffee" or variants thereof, social-networking system 1002 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1002 may calculate a coefficient based on the type of relationship between particular objects. Referencing the social graph 1100, social-networking system 1002 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1002 may determine that the user has a higher coefficient with respect to the first photo than the second photo because having a tagged-in-type relationship with content may be assigned a higher weight and/or rating than having a like-type relationship with content. In particular embodiments, social-networking system 1002 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1002 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, social-networking system 1002 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1006 of the user). A first user may be more interested in other users or concepts that are closer to the first user. As an example and not by way of limitation, if a user is one mile from an airport and two miles from a gas station, social-networking system 1002 may determine that the user has a higher coefficient for the airport than the gas station based on the proximity of the airport to the user.

In particular embodiments, social-networking system 1002 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1002 may provide information that is relevant to user's interests and current circumstances, increasing the likelihood that they will find such information of interest. In particular embodiments, social-networking system 1002 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1002 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1002 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1008 (e.g., via an API or other communication channel), or from another suitable system. In response to the request, social-networking system 1002 may calculate the coefficient (or access the coefficient information if it has previously been calculated and stored). In particular embodiments, social-networking system 1002 may measure an affinity with respect to a particular process. Different processes (both internal and external to the online social network) may request a coefficient for a particular object or set of objects. Social-networking system 1002 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/971,0027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by social-networking system 1002 or shared with other systems (e.g., third-party system 1008). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1008, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 1002 may send a request to the data store for the object. The request may identify the user associated with the request and may only be sent to the user (or a client system 1006 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A computer-implemented method comprising:
analyzing, by one or more servers, interactions related to an association between a first user and a second user of an electronic communications system;
identifying, by the one or more servers, a threshold activity requirement for highly active messaging threads, the threshold activity requirement comprising a predetermined number of electronic messages exchanged between participants within a predetermined amount of time;
generating, by the one or more servers and based on the analyzed interactions, an activity score representing a likelihood that the first user and the second user will engage in a highly active messaging thread meeting the threshold activity requirement; and
ranking, by the one or more servers, the second user within a contact list for the first user based on the generated activity score; and
providing, by the one or more servers, the contact list for display on a client device associated with the first user.

2. The computer-implemented method as recited in claim 1, further comprising:
generating, based on analyzed interactions related to an association between the first user and a third user of the electronic communications system, an additional activity score representing a likelihood that the first user and the third user will engage in a highly active messaging thread meeting the threshold activity requirement;
determining that the additional activity score does not meet the threshold activity requirement; and
excluding the third user from the contact list in response to the additional activity score not meeting the threshold activity requirement.

3. The computer-implemented method as recited in claim 1, further comprising:
identifying an activity status of the second user, the activity status indicating whether the second user is logged into a messaging application associated with the electronic communications system; and
providing a status indicator associated with the activity status for display within the contact list on the client device associated with the first user.

4. The computer-implemented method as recited in claim 1, further comprising:
providing, for display on the client device associated with the first user, a message recommending an interaction with the second user;
receiving, from the client device of the first user, a request by the first user to interact with the second user based on the message; and
initiating a messaging thread between the first user and the second user in accordance with the request by the first user to interact with the second user.

5. The computer-implemented method as recited in claim 1, further comprising:
identifying one or more additional interactions related to the association between the first user and the second user;
updating the activity score based on the one or more additional interactions;
changing a position of the second user in the contact list based on the updated activity score; and
providing an updated contact list comprising the changed position of the second user for display on the client device associated with the first user.

6. The computer-implemented method as recited in claim 1, further comprising:
determining that a first plurality of activity scores for a first set of users associated with the first user meet or exceed a predetermined threshold;
determining that a second plurality of activity scores for a second set of users associated with the first user do not meet the predetermined threshold; and
wherein providing the contact list comprises organizing the first set of users into a first group within the contact list and the second set of users into a second group within the contact list.

7. The computer-implemented method as recited in claim 6, further comprising:
identifying one or more additional interactions related to an association between the first user and a third user in the second set of users;
updating an activity score corresponding to the first user and the third user based on the one or more additional interactions;
determining that the activity score corresponding to the first user and the third user meets the threshold; and
moving the third user from the second group to the first group in the contact list in response to the activity score corresponding to the first user and the third user meeting the threshold.

8. A system comprising:
at least one processor; and
at least one non-transitory computer readable storage medium storing instructions thereon that, when executed by the at least one processor, cause the system to:
analyze interactions related to an association between a first user and a second user of an electronic communications system;
identify a threshold activity requirement for highly active messaging threads, the threshold activity requirement comprising a predetermined number of electronic messages exchanged between participants within a predetermined amount of time;
generate, based on the analyzed interactions, an activity score representing a likelihood that the first user and the second user will engage in a highly active messaging thread meeting the threshold activity requirement; and
rank the second user within a contact list for the first user based on the generated activity score; and
provide the contact list for display on a client device associated with the first user.

9. The system as recited in claim 8, further comprising instructions that, when executed by the at least one processor, cause the system to:
generate, based on analyzed interactions related to an association between the first user and a third user of the electronic communications system, an additional activity score representing a likelihood that the first user and the third user will engage in a highly active messaging thread meeting the threshold activity requirement;

determine that the additional activity score does not meet the threshold activity requirement; and exclude the third user from the contact list in response to the additional activity score not meeting the threshold activity requirement.

10. The system as recited in claim 8, further comprising instructions that, when executed by the at least one processor, cause the system to:

identify an activity status of the second user, the activity status indicating whether the second user is logged into a messaging application associated with the electronic communications system; and provide a status indicator associated with the activity status for display within the contact list on the client device associated with the first user.

11. The system as recited in claim 8, further comprising instructions that, when executed by the at least one processor, cause the system to:

provide, for display on the client device associated with the first user, a message recommending an interaction with the second user;

receive, from the client device of the first user, a request by the first user to interact with the second user based on the message; and initiate a messaging thread between the first user and the second user in accordance with the request by the first user to interact with the second user.

12. The system as recited in claim 8, further comprising instructions that, when executed by the at least one processor, cause the system to:

identify one or more additional interactions related to the association between the first user and the second user;

update the activity score based on the one or more additional interactions;

change a position of the second user in the contact list based on the updated activity score; and provide an updated contact list comprising the changed position of the second user for display on the client device associated with the first user.

13. The system as recited in claim 8, further comprising instructions that, when executed by the at least one processor, cause the system to:

determine that a first plurality of activity scores for a first set of users associated with the first user meet or exceed a predetermined threshold;

determine that a second plurality of activity scores for a second set of users associated with the first user do not meet the predetermined threshold; and wherein the instructions that, when executed by the at least one processor, cause the system to provide the contact list further cause the system to organize the first set of users into a first group within the contact list and the second set of users into a second group within the contact list.

14. The system as recited in claim 13, further comprising instructions that, when executed by the at least one processor, cause the system to:

identify one or more additional interactions related to an association between the first user and a third user in the second set of users;

update an activity score corresponding to the first user and the third user based on the one or more additional interactions;

determine that the activity score corresponding to the first user and the third user meets the threshold; and move the third user from the second group to the first group in the contact list in response to the activity score corresponding to the first user and the third user meeting the threshold.

15. A non-transitory computer readable storage medium storing instructions thereon that, when executed by at least one processor, cause a computer system to:

analyze interactions related to an association between a first user and a second user of an electronic communications system;

identify a threshold activity requirement for highly active messaging threads, the threshold activity requirement comprising a predetermined number of electronic messages exchanged between participants within a predetermined amount of time;

generate, based on the analyzed interactions, an activity score representing a likelihood that the first user and the second user will engage in a highly active messaging thread meeting the threshold activity requirement; and rank the second user within a contact list for the first user based on the generated activity score; and provide the contact list for display on a client device associated with the first user.

16. The non-transitory computer readable storage medium as recited in claim 15, further comprising instructions that, when executed by the at least one processor, cause the computer system to:

generate, based on analyzed interactions related to an association between the first user and a third user of the electronic communications system, an additional activity score representing a likelihood that the first user and the third user will engage in a highly active messaging thread meeting the threshold activity requirement;

determine that the additional activity score does not meet the threshold activity requirement; and exclude the third user from the contact list in response to the additional activity score not meeting the threshold activity requirement.

17. The non-transitory computer readable storage medium as recited in claim 15, further comprising instructions that, when executed by the at least one processor, cause the computer system to:

identify an activity status of the second user, the activity status indicating whether the second user is logged into a messaging application associated with the electronic communications system; and provide a status indicator associated with the activity status for display within the contact list on the client device associated with the first user.

18. The non-transitory computer readable storage medium as recited in claim 15, further comprising instructions that, when executed by the at least one processor, cause the computer system to:

provide, for display on the client device associated with the first user, a message recommending an interaction with the second user;

receive, from the client device of the first user, a request by the first user to interact with the second user based on the message; and initiate a messaging thread between the first user and the second user in accordance with the request by the first user to interact with the second user.

19. The non-transitory computer readable storage medium as recited in claim 15, further comprising instructions that, when executed by the at least one processor, cause the computer system to:

identify one or more additional interactions related to the association between the first user and the second user;

update the activity score based on the one or more additional interactions;

change a position of the second user in the contact list based on the updated activity score; and provide an updated contact list comprising the changed position of the second user for display on the client device associated with the first user.

20. The non-transitory computer readable storage medium as recited in claim 15, further comprising instructions that, when executed by the at least one processor, cause the computer system to:

determine that a first plurality of activity scores for a first set of users associated with the first user meet or exceed a predetermined threshold;

determine that a second plurality of activity scores for a second set of users associated with the first user do not meet the predetermined threshold; and wherein the instructions that, when executed by the at least one processor, cause the system to provide the contact list further cause the system to organize the first set of users into a first group within the contact list and the second set of users into a second group within the contact list.

* * * * *